United States Patent
Zhang et al.

(10) Patent No.: US 11,902,143 B2
(45) Date of Patent: Feb. 13, 2024

(54) NETWORK CONNECTION PATH DETERMINING METHOD AND DEVICE, AND COMMUNICATIONS SYSTEM

(71) Applicant: Huawei Technologies Co., Ltd., Shenzhen (CN)

(72) Inventors: Liya Zhang, Wuhan (CN); Chao Fang, Dongguan (CN); Zheng Lv, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 267 days.

(21) Appl. No.: 17/320,893

(22) Filed: May 14, 2021

(65) Prior Publication Data

US 2021/0273875 A1 Sep. 2, 2021

Related U.S. Application Data

(63) Continuation of application No. PCT/CN2019/128123, filed on Dec. 25, 2019.

(30) Foreign Application Priority Data

Dec. 25, 2018 (CN) .......................... 201811589571.8

(51) Int. Cl.
*H04L 45/02* (2022.01)
*H04L 45/302* (2022.01)
*H04L 67/51* (2022.01)

(52) U.S. Cl.
CPC .............. *H04L 45/02* (2013.01); *H04L 45/04* (2013.01); *H04L 45/302* (2013.01); *H04L 67/51* (2022.05)

(58) Field of Classification Search
None
See application file for complete search history.

(56) References Cited

U.S. PATENT DOCUMENTS

| 7,555,546 | B1 | 6/2009 | Anumala | |
|---|---|---|---|---|
| 11,265,850 | B2 * | 3/2022 | Werb | ................... H04W 56/002 |
| 2005/0169313 | A1 | 8/2005 | Okamura et al. | |
| 2006/0140190 | A1 | 6/2006 | Lee | |
| 2007/0280240 | A1 * | 12/2007 | Beach | ..................... H04L 45/00 370/392 |
| 2008/0151896 | A1 | 6/2008 | Zhang et al. | |

(Continued)

FOREIGN PATENT DOCUMENTS

| CN | 1589060 A | 3/2005 |
|---|---|---|
| CN | 1794685 A | 6/2006 |

(Continued)

*Primary Examiner* — Xavier S Wong
(74) *Attorney, Agent, or Firm* — Conley Rose, P.C.

(57) ABSTRACT

A method includes determining a network connection path that passes through m reference network devices, where m≥1, and the m reference network devices are located in a network domain and are coupled to a device outside the network domain, determining a device configuration requirement of a first network connection service for each of n reference network devices that the network connection path passes through, where m≥n≥1, and determining that the network connection path is one of paths of the first network connection service when the device configuration meets the device configuration requirement.

20 Claims, 11 Drawing Sheets

(56) References Cited

U.S. PATENT DOCUMENTS

| | | | |
|---|---|---|---|
| 2009/0086744 | A1 | 4/2009 | Huang |
| 2009/0285090 | A1* | 11/2009 | Allasia ................ H04L 12/2854 370/221 |
| 2009/0303985 | A1 | 12/2009 | Tanabe et al. |
| 2012/0182991 | A1 | 7/2012 | Vazquez et al. |
| 2012/0300676 | A1 | 11/2012 | Welin et al. |
| 2015/0036535 | A1 | 2/2015 | Mosko et al. |
| 2015/0296028 | A1* | 10/2015 | Scott ....................... H04L 67/51 709/217 |
| 2017/0019877 | A1* | 1/2017 | Ubeda Castellanos ...................... H04L 45/02 |
| 2017/0187606 | A1 | 6/2017 | Chen |
| 2017/0223723 | A1* | 8/2017 | Das ................... H04W 72/0453 |
| 2017/0302474 | A1 | 10/2017 | Li et al. |
| 2017/0346722 | A1 | 11/2017 | Smith et al. |
| 2020/0280889 | A1* | 9/2020 | Liu ....................... H04W 28/24 |

FOREIGN PATENT DOCUMENTS

| | | |
|---|---|---|
| CN | 1866852 A | 11/2006 |
| CN | 101087234 A | 12/2007 |
| CN | 101286921 A | 10/2008 |
| CN | 101491039 A | 7/2009 |
| CN | 101589581 A | 11/2009 |
| CN | 106375214 A | 2/2017 |
| CN | 107786448 A | 3/2018 |
| CN | 107820262 A | 3/2018 |
| CN | 108432191 A | 8/2018 |
| CN | 107078935 B | 2/2020 |
| EP | 3402124 A1 | 11/2018 |
| WO | 2017211385 A1 | 12/2017 |

\* cited by examiner

```
CONT.                              CONT.   CONT.      CONT.
FROM                               FROM    FROM       FROM
FIG. 6A                            FIG. 6A FIG. 6A    FIG. 6A
```

607

Change the device configuration according to the received configuration change instruction

608

Determine that the network connection path is one of paths of the second network connection service

609

Send a record change instruction, where the record change instruction is used to instruct the recording device to change a record that the network connection path is one of paths of a first network connection service to a record that the network connection path is one of the paths of the second network connection service

610

Change, according to the received record change instruction, the record that the network connection path is one of the paths of the first network connection service to the record that the network connection path is one of the paths of the second network connection service

FIG. 6B

NETWORK CONNECTION PATH DETERMINING METHOD AND DEVICE, AND COMMUNICATIONS SYSTEM

CROSS-REFERENCE TO RELATED APPLICATIONS

This application is a continuation of International Patent Application No. PCT/CN2019/128123 filed on Dec. 25, 2019, which claims priority to Chinese Patent Application No. 201811589571.8 filed on Dec. 25, 2018. The disclosures of the aforementioned applications are hereby incorporated by reference in their entireties.

TECHNICAL FIELD

This application relates to the field of communications technologies, and in particular, to a network connection path determining method and device, and a communications system.

BACKGROUND

A communications network includes a plurality of network units (for example, network elements or components in the network elements), and the communications network may provide a plurality of types of network connection services for a customer by using the plurality of network units, for example, a network connection service (or an interconnection private line service) used to connect a customer terminal to another terminal, and a network connection service (or as an Internet access private line service) used to connect the customer terminal to the internet.

In a related technology, when the customer subscribes to a network connection service, a staff member needs to connect the customer terminal to the other terminal by using the plurality of network units. Then, the staff member further sets device configurations (for example, a virtual local area network (VLAN) address, a communication protocol, and a quality of service (QoS) configuration) of these network units based on the network connection service, so that a device configuration of each network unit meets a device configuration requirement of the network connection service for the network unit. When using the network connection service, the customer may further apply for changing the network connection service. In this case, the staff member needs to search, in the communications network, for a plurality of network units on a network connection path between the customer terminal and the other terminal, and adjust configurations of these network units based on a changed network connection service, so that a device configuration of each network unit meets a device configuration requirement of the changed network connection service for the network unit.

However, there are more network units in the communications network, and connections between the network units are more complex. Therefore, it is increasingly difficult for the staff member to search, in the communications network, for a network unit used to provide a network connection service. Consequently, an error rate of searching for the network unit in the communications network by the staff member is relatively high, and change efficiency of the network connection service is relatively low.

SUMMARY

This application provides a network connection path determining method and device, and a communications system, to resolve a problem of relatively low change efficiency of a network connection service. The technical solutions are as follows.

According to one aspect, a network connection path determining method is provided and is applied to a path determining device in a communications system. The communications system further includes a plurality of network units located in at least one network domain. The method includes determining a network connection path that passes through m reference network units, where $m \geq 1$, and the reference network unit is a network unit that is in a network domain in which the reference network unit is located and that is connected to a device outside the network domain in which the reference network unit is located, determining a device configuration requirement of a first network connection service for each of n reference network units that the network connection path passes through, where $m \geq n \geq 1$, determining whether a device configuration of each reference network unit meets the device configuration requirement of the first network connection service for each reference network unit, and determining that the network connection path is one of paths of the first network connection service when the device configuration of each reference network unit meets the device configuration requirement of the first network connection service for each reference network unit.

In the network connection path determining method provided in this embodiment of the present disclosure, a network connection path can be identified as one of paths of which network connection service. In this way, when searching for a network unit used to provide a network connection service, a staff member may directly search in a path of the network connection service. Therefore, difficulty and an error rate of searching for the network unit by the staff member are reduced, and change efficiency of the network connection service is improved.

Optionally, the plurality of network units is located in a plurality of network domains, and the network connection path passes through reference network units in at least two network domains. In this embodiment of the present disclosure, whether a cross-domain network connection path is one of the paths of the first network connection service can be determined.

Optionally, before determining a network connection path that passes through m reference network units, the method further includes determining a plurality of deployed network domains deployed by the first network connection service in the plurality of network domains, obtaining a connection relationship between the plurality of deployed network domains, and determining a basic connection path between network units in each deployed network domain, and determining a network connection path that passes through m reference network units includes connecting basic connection paths in at least two deployed network domains based on the determined connection relationship, to obtain the network connection path.

Optionally, at least one deployed network domain deployed by the first network connection service exists in the at least one network domain, at least one border network unit group exists in each of the at least one deployed network domain, the border network unit group includes at least one border network unit that accesses one network domain in each deployed network domain, border network units in different border network unit groups access different network domains, and before determining a device configuration requirement of a first network connection service for each of n reference network units that the network connection path passes through, the method further includes obtaining a device configuration requirement corresponding to each border network unit group in each deployed network domain, where the device configuration requirement corresponding to each border network unit group is a device configuration requirement of the first network connection service for any border network unit in each border network unit group, and determining a device configuration requirement of a first network connection service for each of n reference network units that the network connection path passes through includes determining a device configuration requirement corresponding to a border network unit group in which each reference network unit is located as the device configuration requirement of the first network connection service for each reference network unit. Because the device configuration requirement corresponding to the border network unit group is obtained in advance, the device configuration requirement of the first network connection service for the reference network unit can be easily obtained.

Optionally, determining that the network connection path is one of paths of the first network connection service when the device configuration of each reference network unit meets the device configuration requirement of the first network connection service for each reference network unit includes, when the device configuration of each reference network unit meets the device configuration requirement of the first network connection service for each reference network unit, presenting a judgment result about whether the device configuration of each reference network unit meets the device configuration requirement of the first network connection service for each reference network unit, receiving an instruction for the judgment result, where the instruction for the judgment result is a first instruction used to instruct that the network connection path is allowed to be determined as one of the paths of the first network connection service, or a second instruction used to instruct that the network connection path is forbidden to be determined as one of the paths of the first network connection service, and when the instruction for the judgment result is the first instruction, determining that the network connection path is one of the paths of the first network connection service, and the method further includes, when the instruction for the judgment result is the second instruction, determining that the network connection path is not one of the paths of the first network connection service. In this way, after the device configuration of each reference network unit meets the device configuration requirement of the first network connection service for the reference network unit, the path determining device may further determine, with reference to re-determining by the user, whether the network connection path that passes through the n reference network units is one of the paths of the first network connection service. Therefore, accuracy of a determined relationship between the network connection service and the path can be improved.

Optionally, after determining that the network connection path is one of paths of the first network connection service, the method further includes receiving a service change instruction for the network connection path, where the service change instruction is used to instruct to change the first network connection service to a second network connection service, determining device configuration requirements of the second network connection service for the n reference network units, determining whether a device configuration of each reference network unit meets a device configuration requirement of the second network connection service for each reference network unit, and when at least one target network unit exists in the n reference network units, sending, according to the service change instruction, a configuration change instruction used to instruct to change a device configuration to the at least one target network unit, where before each target network unit changes the device configuration according to the received configuration change instruction, the device configuration of each target network unit does not meet a device configuration requirement of the second network connection service for each target network unit, and after each target network unit changes the device configuration according to the received configuration change instruction, the device configuration of each target network unit meets the device configuration requirement of the second network connection service for each target network unit. It can be learned that in this embodiment of the present disclosure, a service implemented by using the network connection path can be automatically changed based on a determined relationship between the network connection path and the network connection service. Therefore, an effect that the staff member does not need to search for a network unit in the communications system can be implemented, and change efficiency of the network connection service is further improved.

Optionally, the communications system further includes a recording device, and the method further includes, when the network connection path is one of the paths of the first network connection service, sending a recording instruction to the recording device, where the recording instruction is used to instruct the recording device to record the network connection path as one of the paths of the first network connection service.

Optionally, the communications system further includes a plurality of management devices that one-to-one correspond to the plurality of network domains, each management device is connected to a network unit in a network domain corresponding to the management device, and determining a basic connection path between network units in each deployed network domain includes receiving the basic connection path that is between the network units in each deployed network domain and that is sent by a management device corresponding to each of the plurality of deployed network domains.

Optionally, the device configuration includes at least one of a QoS configuration, a VLAN address, a communication protocol, and a device protection configuration.

According to another aspect, a network connection path determining method is provided and is applied to a recording device in a communications system. The communications system further includes a path determining device. The method includes receiving a recording instruction sent by the path determining device, where the recording instruction is used to instruct the recording device to record a network connection path as one of paths of a first network connection service, and recording, according to the recording instruction, that the network connection path is one of the paths of the first network connection service.

According to another aspect, a network connection path determining method is provided and is applied to a management device in a communications system. The communications system further includes a path determining device and a network unit that is connected to the management device and that is located in a deployed network domain. The deployed network domain is a network domain deployed by a first network connection service. The method includes obtaining a basic connection path between network units in the deployed network domain, and sending the basic connection path to the path determining device.

According to another aspect, a path determining device is provided. A communications system in which the path determining device is located further includes a plurality of network units located in at least one network domain. The path determining device includes a first determining module, configured to determine a network connection path that passes through m reference network units, where m≥1, and the reference network unit is a network unit that is in a network domain in which the reference network unit is located and that is connected to a device outside the network domain in which the reference network unit is located, a second determining module, configured to determine a device configuration requirement of a first network connection service for each of n reference network units that the network connection path passes through, where m≥n≥1, a first judgment module, configured to determine whether a device configuration of each reference network unit meets the device configuration requirement of the first network connection service for each reference network unit, and a third determining module, configured to determine that the network connection path is one of paths of the first network connection service when the device configuration of each reference network unit meets the device configuration requirement of the first network connection service for each reference network unit.

Optionally, the plurality of network units is located in a plurality of network domains, and the network connection path passes through reference network units in at least two network domains.

Optionally, the path determining device further includes a fourth determining module, configured to determine a plurality of deployed network domains deployed by the first network connection service in the plurality of network domains, a first obtaining module, configured to obtain a connection relationship between the plurality of deployed network domains, and a fifth determining module, configured to determine a basic connection path between network units in each deployed network domain. The first determining module is configured to connect basic connection paths in at least two deployed network domains based on the determined connection relationship, to obtain the network connection path.

Optionally, at least one deployed network domain deployed by the first network connection service exists in the at least one network domain, at least one border network unit group exists in each of the at least one deployed network domain, the border network unit group includes at least one border network unit that accesses one network domain in each deployed network domain, and border network units in different border network unit groups access different network domains. The path determining device further includes a second obtaining module, configured to obtain a device configuration requirement corresponding to each border network unit group in each deployed network domain, where the device configuration requirement corresponding to each border network unit group is a device configuration requirement of the first network connection service for any border network unit in each border network unit group. The second determining module is configured to determine a device configuration requirement corresponding to a border network unit group in which each reference network unit is located as the device configuration requirement of the first network connection service for each reference network unit.

Optionally, the third determining module is configured to, when the device configuration of each reference network unit meets the device configuration requirement of the first network connection service for each reference network unit, present a judgment result about whether the device configuration of each reference network unit meets the device configuration requirement of the first network connection service for each reference network unit, receive an instruction for the judgment result, where the instruction for the judgment result is a first instruction used to instruct that the network connection path is allowed to be determined as one of the paths of the first network connection service, or a second instruction used to instruct that the network connection path is forbidden to be determined as one of the paths of the first network connection service, and when the instruction for the judgment result is the first instruction, determine that the network connection path is one of the paths of the first network connection service. The path determining device further includes a sixth determining module, configured to, when the instruction for the judgment result is the second instruction, determine that the network connection path is not one of the paths of the first network connection service.

Optionally, the path determining device further includes a receiving module, configured to receive a service change instruction for the network connection path, where the service change instruction is used to instruct to change the first network connection service to a second network connection service, a seventh determining module, configured to determine device configuration requirements of the second network connection service for the n reference network units, a second judgment module, configured to determine whether a device configuration of each reference network unit meets a device configuration requirement of the second network connection service for each reference network unit, and a first sending module, configured to when at least one target network unit exists in the n reference network units, send, according to the service change instruction, a configuration change instruction used to instruct to change a device configuration to the at least one target network unit, where before each target network unit changes the device configuration according to the received configuration change instruction, the device configuration of each target network unit does not meet a device configuration requirement of the second network connection service for each target network unit, and after each target network unit changes the device configuration according to the received configuration change instruction, the device configuration of each target network unit meets the device configuration requirement of the second network connection service for each target network unit.

Optionally, the communications system further includes a recording device, and path determining device further includes a second sending module, configured to, when the network connection path is one of the paths of the first network connection service, send a recording instruction to the recording device, where the recording instruction is used to instruct the recording device to record the network connection path as one of the paths of the first network connection service.

Optionally, the communications system further includes a plurality of management devices that one-to-one correspond to the plurality of network domains, and each management device is connected to a network unit in a network domain corresponding to the management device. The fifth determining module is configured to receive the basic connection path that is between the network units in each deployed network domain and that is sent by a management device corresponding to each of the plurality of deployed network domains.

Optionally, the device configuration includes at least one of a QoS configuration, a VLAN address, a communication protocol, and a device protection configuration.

According to another aspect, a recording device is provided. A communications system in which the recording device is located further includes a path determining device. The recording device includes a receiving module, configured to receive a recording instruction sent by the path determining device, where the recording instruction is used to instruct the recording device to record a network connection path as one of paths of a first network connection service, and a recording module, configured to record, according to the recording instruction, that the network connection path is one of the paths of the first network connection service.

According to another aspect, a management device is provided. A communications system in which the management device is located further includes a path determining device and a network unit that is connected to the management device and that is located in a deployed network domain. The deployed network domain is a network domain deployed by a first network connection service. The management device includes an obtaining module, configured to obtain a basic connection path between network units in the deployed network domain, and a sending module, configured to send the basic connection path to the path determining device.

According to another aspect, a communications system is provided. The communications system includes a path determining device and a plurality of network units located in at least one network domain. The path determining device is configured to determine a network connection path that passes through m reference network units, where $m \geq 1$, and the reference network unit is a network unit that is in a network domain in which the reference network unit is located and that is connected to a device outside the network domain in which the reference network unit is located, determine a device configuration requirement of a first network connection service for each of n reference network units that the network connection path passes through, where $m \geq n \geq 1$, determine whether a device configuration of each reference network unit meets the device configuration requirement of the first network connection service for each reference network unit, and determine that the network connection path is one of paths of the first network connection service when the device configuration of each reference network unit meets the device configuration requirement of the first network connection service for each reference network unit.

Optionally, the communications system further includes the foregoing recording device, and the path determining device is further configured to, when the network connection path is one of the paths of the first network connection service, send a recording instruction to the recording device, where the recording instruction is used to instruct the recording device to record the network connection path as one of the paths of the first network connection service. The recording device is configured to receive the recording instruction sent by the path determining device, where the recording instruction is used to instruct the recording device to record the network connection path as one of the paths of the first network connection service, and record, according to the recording instruction, that the network connection path is one of the paths of the first network connection service.

Optionally, the communications system further includes at least one management device. At least one network domain in which the plurality of network units is located one-to-one correspond to the at least one management device. Each management device is connected to a network unit in a network domain corresponding to the management device. At least one deployed network domain deployed by the first network connection service exists in the at least one network domain. A management device connected to each deployed network domain is configured to obtain a basic connection path between network units in each deployed network domain, and send the basic connection path to the path determining device. The path determining device is further configured to receive the basic connection path sent by the management device corresponding to each deployed network domain.

According to another aspect, a device is provided. The device includes at least one processor, at least one interface, a memory, and at least one communications bus. The processor is configured to execute a program stored in the memory, so as to implement the foregoing network connection path determining method.

According to another aspect, a readable storage medium is provided. The storage medium stores a computer program, and when the computer program is executed by a processor, so as to implement the foregoing network connection path determining method.

BRIEF DESCRIPTION OF DRAWINGS

FIG. 6A and FIG. 6B are a flowchart of a method for changing a network connection service according to an embodiment of the present disclosure;

DESCRIPTION OF EMBODIMENTS

To make the objectives, technical solutions, and advantages of this application clearer, the following further describes the implementations of this application in detail with reference to the accompanying drawings.

Figure 1:
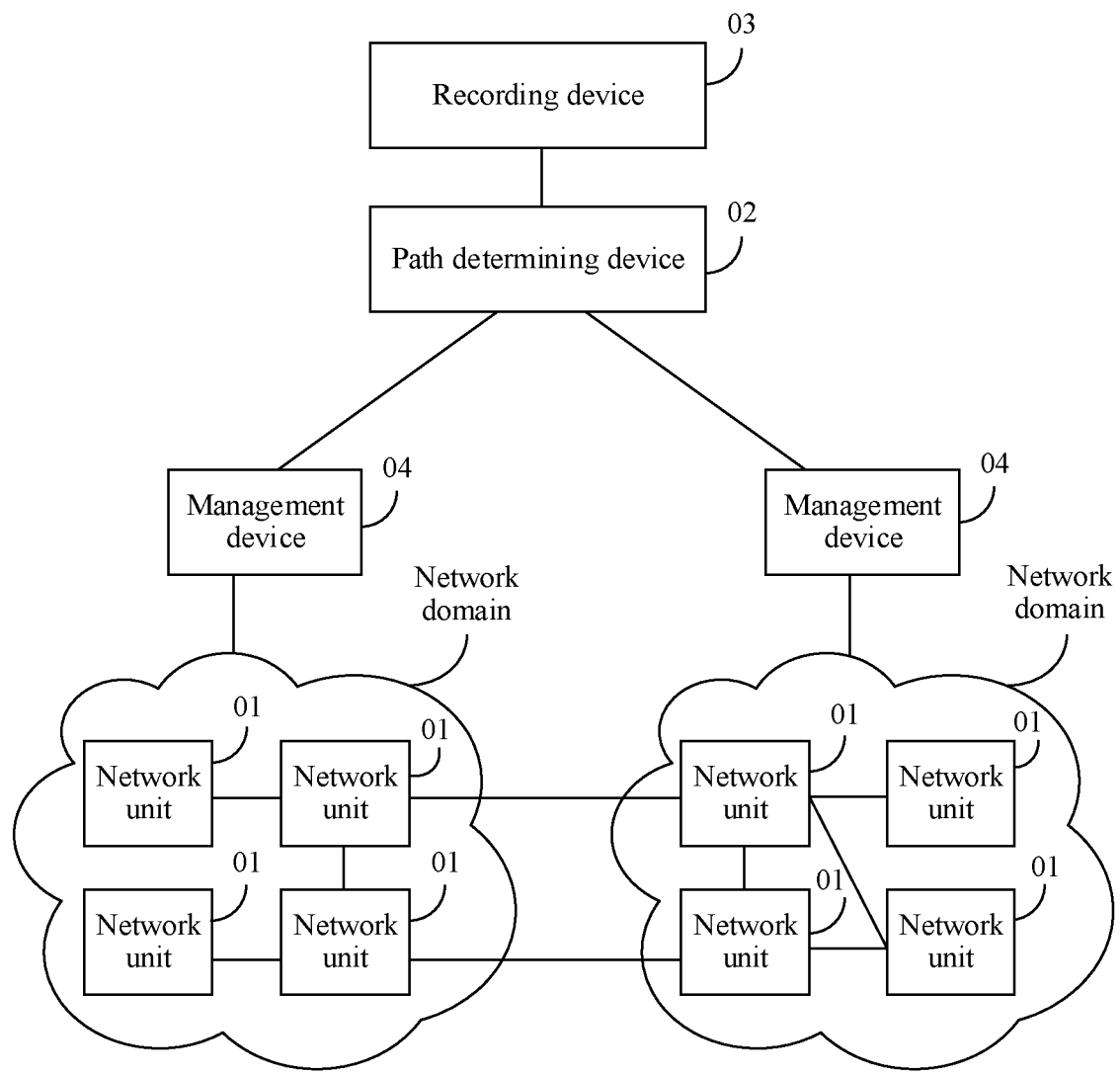
FIG. 1 is a schematic structural diagram of a communications system according to an embodiment of the present disclosure.

FIG. 1 is a schematic structural diagram of a communications system according to an embodiment of the present disclosure. As shown in FIG. 1, the communications system may include a plurality of network units 01 and a path determining device 02. The plurality of network units 01 are connected to form a communications network, and a communication connection may be established between the path determining device 02 and each network unit 01.

Optionally, the network unit 01 may be a network element or a component in the network element (for example, a port component in the network element). This is not limited in this embodiment of the present disclosure. The network element may be a passive optical network (PON) network element, an optical transport network (OTN) network element, an Internet Protocol (IP) network element, a microwave network element, or the like. Optionally, the path determining device 02 may be a server or a server cluster.

It should be noted that the plurality of network units 01 in the communications system can be connected to form the communications network, and the communications network can provide a plurality of types of network connection services (or broadband services). When the communications network provides a network connection service for a terminal by using at least one network unit, the terminal may perform communication based on a network connection path on which the at least one network unit is located. The network connection path may be considered as a sequence formed by identifiers of all network units that the network connection path passes through.

Figure 2:
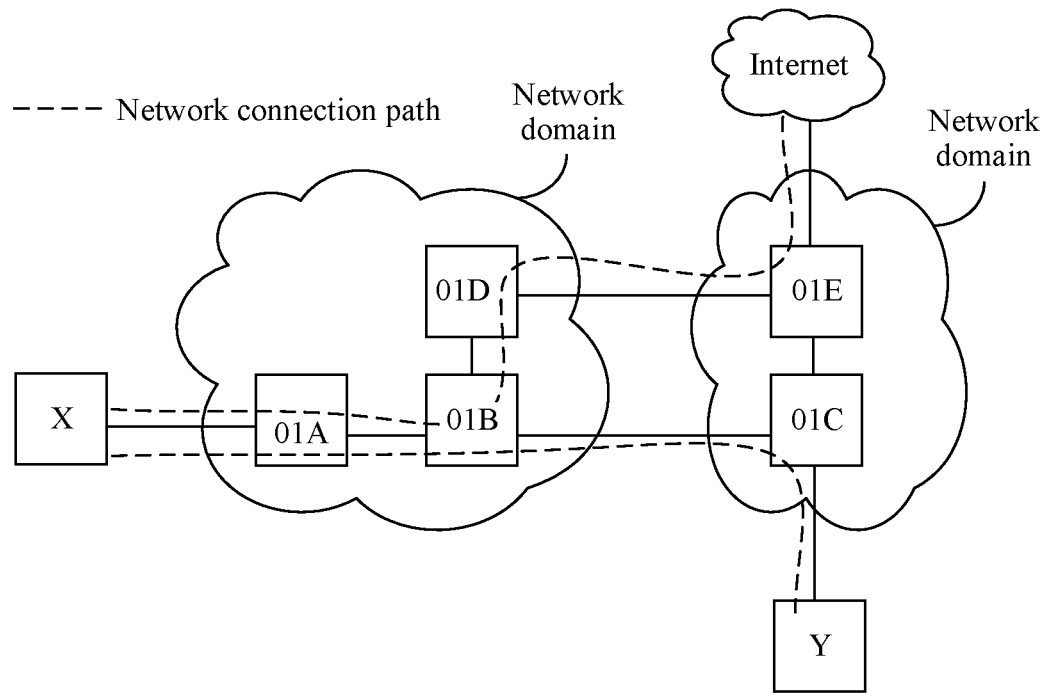
FIG. 2 is a schematic diagram of a network connection path according to an embodiment of the present disclosure.

For example, the plurality of types of network connection services may be classified into a plurality of types according to different connection objects. For example, the plurality of types may include two types of network connection services: an interconnection private line service and an internet access private line service. The interconnection private line service is used to connect a plurality of terminals, and the Internet access private line service is used to connect the terminal to the Internet. For example, each company may have a plurality of branches, and the plurality of branches may subscribe to the interconnection private line service, so that terminals of the plurality of branches are interconnected, thereby facilitating communication between the terminals of the plurality of branches. As shown in FIG. 2, when the communications network provides the interconnection private line service by using the at least one network unit (for example, a network unit 01A, a network unit 01B, and a network unit 01C in FIG. 2), a terminal X and a terminal Y are connected by using a network connection path that passes through the at least one network unit. For another example, each company may further subscribe to the internet access private line service, so that terminals in the company can access the internet, thereby facilitating internet access of the terminals in the company. Still referring to FIG. 2, when the communications network provides the internet access private line service by using the at least one network unit (for example, a network unit 01A, a network unit 01B, a network unit 01D, and a network unit 01E in FIG. 2), a terminal X is connected to the internet by using a network connection path that passes through the at least one network unit.

Optionally, the network connection service may be based on any communications technology, for example, a layer 2 virtual private network (L2VPN) technology or a layer 3 virtual private network (L3VPN) technology.

Further, each type of network connection services provided by the communications network may further be classified into a plurality of sub-types of network connection services, and communication bandwidths of different network connection services are different. The network connection services of these sub-types may be usually referred to as network connection services of a plurality of different bandwidth packages in this type of network connection services.

When the communications network provides each type (which may be the foregoing type or the foregoing sub-type) of network connection services by using the at least one network unit, the network connection service has a specific device configuration requirement for each of the at least one network unit. In addition, different types of network connection services have different device configuration requirements for the network unit.

A device configuration of the network unit refers to a series of parameters configured to implement a function of the network unit. For example, the device configuration of the network unit may include at least one of a QoS configuration (a parameter configured to implement QoS), a VLAN address (a parameter configured to implement a VLAN), a communication protocol (a parameter that is configured to implement communication and that is related to a protocol used for communication), and a device protection configuration (a parameter configured to implement device protection, and the device protection may be protection in aspects such as reducing operating load of the network unit and preventing a data loss in the network unit). Optionally, the device configuration of the network unit may further include another device configuration. This is not limited in this embodiment of the present disclosure. The device configuration requirement of the network connection service for the network unit refers to a requirement of the network connection service for a parameter configured to implement at least one function of the network unit. For example, a device configuration requirement of a network connection service for a network unit may include a QoS configuration is a specified QoS configuration, and a VLAN address range is [0, 100].

Optionally, still referring to FIG. 1, the communications system may further include a recording device 03, at least one management device 04, and a terminal (not shown in FIG. 1). In FIG. 1, an example in which the communications system includes two management devices 04 is used. The recording device 03 is connected to the path determining device 02. The at least one management device 04 one-to-one corresponds to at least one network domain. A plurality of network units 01 exist in a network domain corresponding to each management device 04, and each of the at least one network unit 01 is connected to the management device 04. It should be noted that the plurality of network units 01 in the communications system include a network unit 01 in the at least one network domain, and the network domain may also be referred to as a flow domain (FD). The plurality of network units 01 in the communications system may be classified into the at least one network domain based on functions and/or operators of the network units. A network unit in each network domain can implement at least one network function. Generally, network functions that can be implemented in network domains that are geographically adjacent to each other are different.

Each management device 04 may further establish a communication connection to the path determining device 02. It should be noted that the plurality of network units can provide a plurality of types of network connection services. Each type of network connection services may include a plurality of network connection services, and each network connection service is instantiation of one type of network connection service. Therefore, the plurality types of network connection services generally run in the communications network, and the recording device 03 may be a service management device configured to manage these services.

Figure 3:
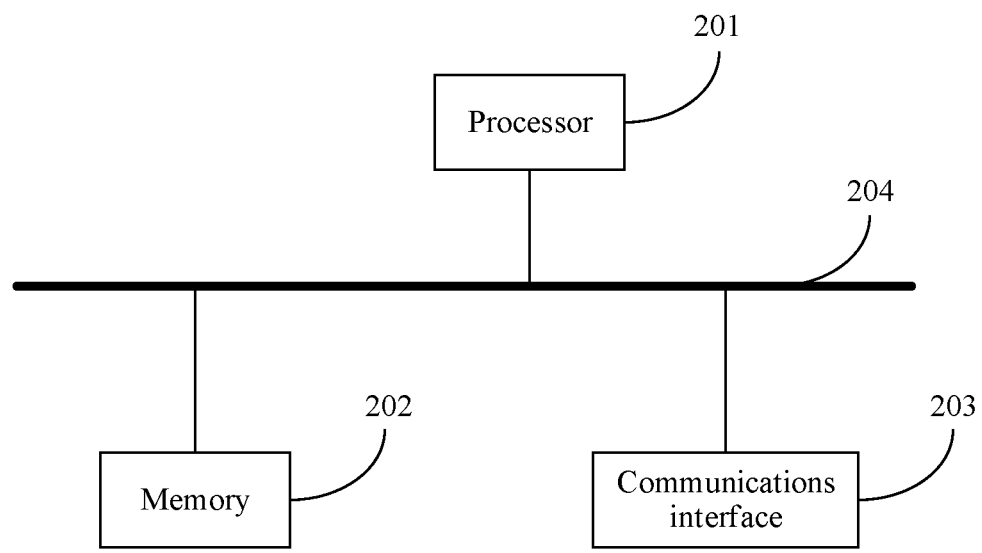
FIG. 3 is a schematic structural diagram of a device according to an embodiment of the present disclosure.

For example, FIG. 3 is a schematic structural diagram of a device according to an embodiment of the present disclosure. The device may be the path determining device, the recording device, or the management device in FIG. 1. The device shown in FIG. 3 may include a processor 201, a memory 202, a communications interface 203, and a bus 204. The processor 201, the memory 202, the communications interface 203 are communicatively connected to each other through the bus 204. There is a plurality of communications interfaces 203, configured to communicate with another device under control of the processor 201. The memory 202 is configured to store a computer instruction. The processor 201 can invoke, through the bus 204, the computer instruction stored in the memory 202. Optionally, the device shown in FIG. 3 may further include an input component (not shown in FIG. 3) and an output component (not shown in FIG. 3). Both the input component and the output component are connected to the bus, and communicate with the processor, the memory, and the communications interface in the device through the bus. The input component is used by a user to input information into the device. For example, the input component may include at least one of a mouse, a keyboard, a touch panel, an electronic stylus, and a Universal Serial Bus (USB) interface. The output component is configured to output information to the user. For example, the output component may include at least one of a display, a stereo, a printer, and a USB interface. Optionally, in FIG. 3, an example in which the input component and the output component are two mutually independent components is used. Optionally, the input component and the output component may alternatively be integrated into one input/output component. This is not limited in this embodiment of the present disclosure.

Optionally, the communications system may further include a business support system (BSS)/operation support system (OSS) (not shown in FIG. 1), and the BSS/OSS may be connected to the recording device 03.

In the communications system provided in this embodiment of the present disclosure, the path determining device 02 is configured to determine a relationship between the network connection path (a connection path of at least two of the plurality of network units 01) and the network connection service. The recording device 03 is configured to record the relationship determined by the path determining device 02. The management device 04 is configured to manage the network unit 01 connected to the management device 04. Based on the communications system provided in this embodiment of the present disclosure, an embodiment of the present disclosure provides a network connection path determining method. The network connection path determining method can determine that a network connection path between the network units 01 is one of paths of which network connection service. In this embodiment of the present disclosure, a process of determining whether a network connection path is one of paths of a first network connection service is used as an example to describe the network connection path determining method provided in this embodiment of the present disclosure. The first network connection service is any network connection service that can be provided by a communications network including a plurality of network units.

Figure 4A:
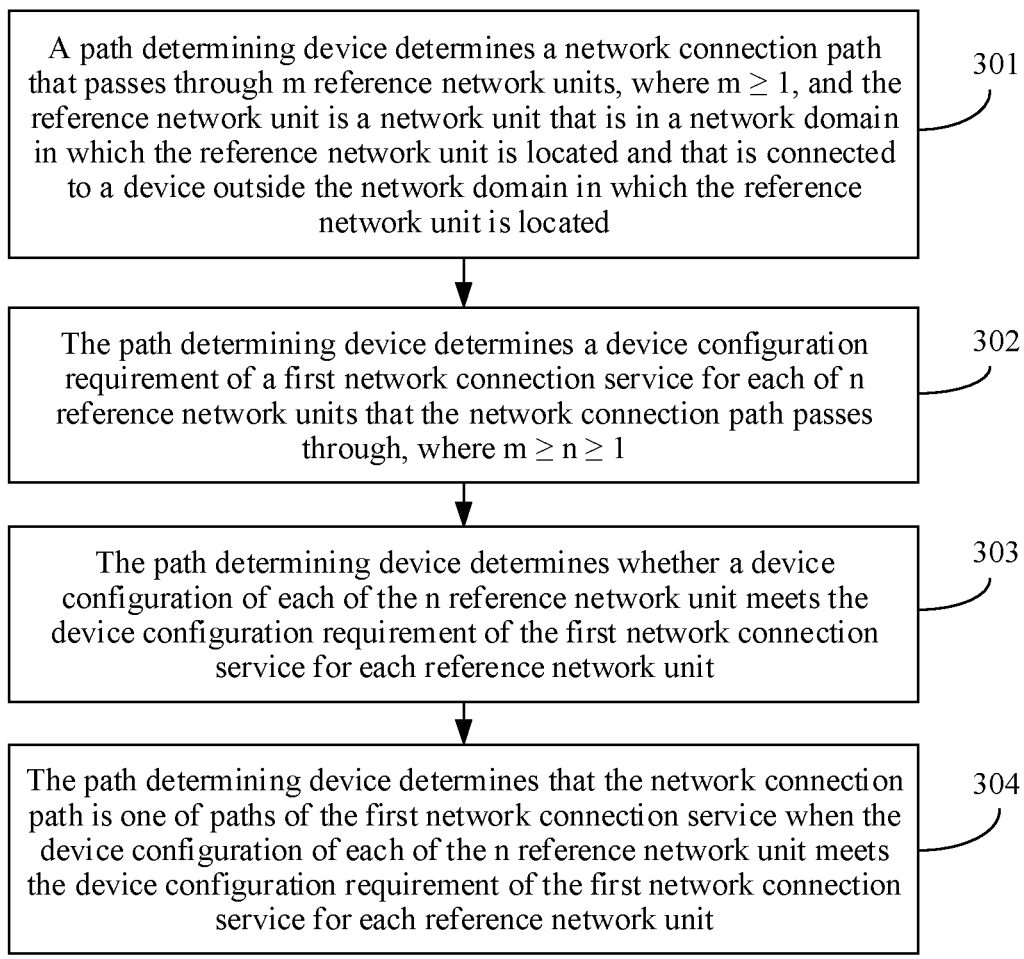
FIG. 4A is a flowchart of a network connection path determining method according to an embodiment of the present disclosure.

FIG. 4A is a flowchart of a network connection path determining method according to an embodiment of the present disclosure. The method may be applied to the path determining device in the communications system shown in FIG. 1. As shown in FIG. 4A, the network connection path determining method may include the following steps.

Step 301: The path determining device determines a network connection path that passes through m reference network units, where m≥1, and the reference network unit is a network unit that is in a network domain in which the reference network unit is located and that is connected to a device outside the network domain in which the reference network unit is located.

Optionally, the network connection path may pass through the m reference network units, and the reference network unit is the network unit that is in the network domain to which the reference network unit belongs and that is connected to the device outside the network domain to which the reference network unit belongs. This is equivalent to that the reference network unit is one of border network units in the network domain to which the reference network unit belongs.

It should be noted that a primary network domain exists in a plurality of network domains in which a plurality of network units in the communications system are located. In the plurality of network domains, the primary network domain is connected to more network domains than another network domain does. The other network domain is any network domain other than the primary network domain in the plurality of network domains. Optionally, the network connection path can implement an end-to-end connection. For example, the network connection path may be used to connect a terminal and the primary network domain, or the network connection path may be used to connect a plurality of terminals. Alternatively, the network connection path is only used to connect any two of the plurality of network units. This is not limited in this embodiment of the present disclosure.

In addition, it should be noted that, in this embodiment of the present disclosure, an example in which the network connection path passes through reference network units in at least two network domains is used. Optionally, the network connection path may alternatively pass through only a reference network unit in one network domain. This is not limited in this embodiment of the present disclosure.

Step 302: The path determining device determines a device configuration requirement of a first network connection service for each of n reference network units that the network connection path passes through, where m≥n≥1.

After determining the network connection path, the path determining device may determine the n reference network units in the m reference network units that the network connection path passes through. Then, the path determining device may determine the device configuration requirement of the first network connection service for each of the n reference network units.

It should be noted that n may be a value pre-stored in the path determining device, or a value obtained by the path determining device from another device, and the n reference network units may be any n reference network units determined by the path determining device in the m reference network units. Alternatively, the n reference network units may be n reference network units selected by the path determining device from the m reference network units based on selection of a user. This is not limited in this embodiment of the present disclosure.

It should further be noted that n may be any positive integer less than or equal to m. For example, n may be equal to m. In this case, the path determining device needs to determine the device configuration requirement of the first network connection service for each reference network unit that the network connection path passes through. Alternatively, n may be less than m. In this case, the path determining device needs to determine only device configuration requirements of the first network connection service for some reference network units that the network connection path passes through. Therefore, when n is less than m, the path determining device needs to obtain a relatively small quantity of device configuration requirements, and load of the path determining device is relatively small.

For example, the path determining device may receive the device configuration requirement that is of the first network connection service for each of the n reference network units and that is entered by the user, to obtain the device configuration requirement of the first network connection service for the reference network unit. The device configuration requirement of the first network connection service for the reference network unit may be considered as a device configuration requirement that the reference network unit needs to meet when the reference network unit is configured to implement the first network connection service.

It should be noted that the first network connection service may have a same device configuration requirement or different device configuration requirements for any two reference network units. This is not limited in this embodiment of the present disclosure. The device configuration in this embodiment of the present disclosure may be any device configuration, for example, at least one of a QoS configuration, a VLAN address, a communication protocol, and a device protection configuration (for example, a load balancing configuration).

Step 303: The path determining device determines whether a device configuration of each of the n reference network units meets the device configuration requirement of the first network connection service for each reference network unit.

After determining device configuration requirements of the first network connection service for the n reference network units, the path determining device needs to determine, based on the device configuration requirement of the first network connection service for each of the n reference network units, whether the device configuration of each reference network unit meets the device configuration requirement of the first network connection service for the reference network unit.

For example, for each of the n reference network units, the device configuration requirement of the first network connection service for the reference network unit may include a requirement of the first network connection service for at least one device configuration. Only after it is determined that each of the at least one device configuration of the reference network unit meets a requirement of the first network connection service for the device configuration, it may be determined that the device configuration of the reference network unit meets the device configuration requirement of the first network connection service for the reference network unit. For each of the at least one device configuration, the path determining device may obtain the device configuration of the reference network unit, and determine, based on the requirement of the first network connection service for the device configuration, whether the device configuration meets the requirement of the first network connection service for the device configuration.

As shown in Table 1, it is assumed that a device configuration requirement of the first network connection service for a reference network unit 1 includes a VLAN address range is [100, 200] (which is a requirement of the first network connection service for a VLAN address), and a QoS configuration is a device default QoS configuration (which is a requirement of the first network connection service for the QoS configuration). The device default QoS configuration is a series of parameters configured on the network unit to enable the network unit to have a highest QoS that the network unit can provide. If in a device configuration of the reference network unit 1, the VLAN address is 100, and the QoS configuration is the device default QoS configuration, the path determining device may obtain two preliminary judgment results the VLAN address of the reference network unit 1 meets the requirement of the first network connection service for the VLAN address of the reference network unit, and the QoS configuration of the reference network unit 1 meets the requirement of the first network connection service for the QoS configuration of the reference network unit. Then, the path determining device may determine that the device configuration of the reference network unit meets a requirement of the first network connection service for each device configuration of the reference network unit 1, and therefore may obtain a final judgment result that the device configuration of the reference network unit 1 meets the device configuration requirement of the first network connection service for the reference network unit.

It is assumed that a device configuration requirement of the first network connection service for a reference network unit 2 is the same as the device configuration requirement of the first network connection service for the reference network unit 1. If in a device configuration of the reference network unit 2, a VLAN address is 99, and a QoS configuration is a device default QoS configuration, the path determining device may obtain two preliminary judgment results: the VLAN address of the reference network unit 2 does not meet a requirement of the first network connection service for the VLAN address of the reference network unit, and the QoS configuration of the reference network unit 2 meets a requirement of the first network connection service for the QoS configuration of the reference network unit. Then, the path determining device may determine that the device configuration of the reference network unit does not meet a requirement of the first network connection service for each device configuration of the reference network unit 2, and therefore may obtain a final judgment result that the device configuration of the reference network unit 2 does not meet the device configuration requirement of the first network connection service for the reference network unit.

TABLE 1

| Reference network unit | Device configuration of the reference network unit | Device configuration requirement of a first network connection service for the reference network unit | Preliminary judgment result | Final judgment result |
|---|---|---|---|---|
| 1 | A VLAN address is 100 | A range is [100, 200] | Met | Met |
|   | A QoS configuration is a device default QoS configuration | Device default QoS configuration | Met |   |
| 2 | A VLAN address is 99 | A range is [100, 200] | Not met | Not met |
|   | A QoS configuration is a device default QoS configuration | Device default QoS configuration | Met |   |

Step 304: The path determining device determines that the network connection path is one of paths of the first network connection service when the device configuration of each of the n reference network units meets the device configuration requirement of the first network connection service for each reference network unit.

After judgment in step 303, if the device configuration of each of the n reference network units that the network connection path passes through meets the device configuration requirement of the first network connection service for the reference network unit, the path determining device may consider that the network connection path is one of the paths of the first network connection service. However, if a device configuration of at least one reference network unit does not meet the device configuration requirement of the first network connection service for the reference network unit, the path determining device cannot determine that the network connection path is one of the paths of the first network connection service.

In conclusion, in the network connection path determining method provided in this embodiment of the present disclosure, a network connection path can be identified as one of paths of which network connection service. In this way, when searching for a network unit used to provide a network connection service, a staff member may directly search in a path of the network connection service. Therefore, difficulty and an error rate of searching for the network unit by the staff member are reduced, and change efficiency of the network connection service is improved.

Figure 4B:
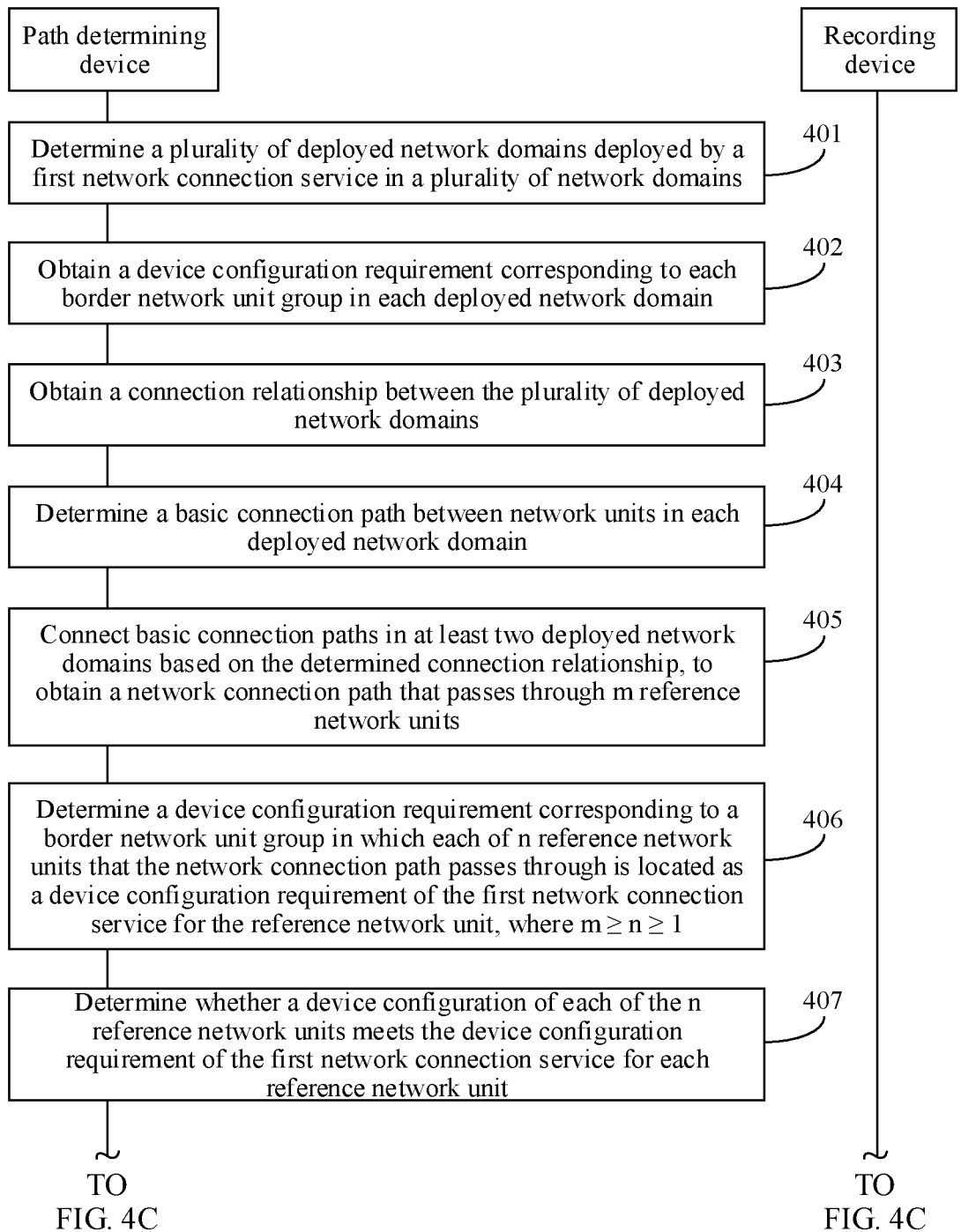
FIG. 4B and FIG. 4C are a flowchart of another network connection path determining method according to an embodiment of the present disclosure.
Figure 4C:
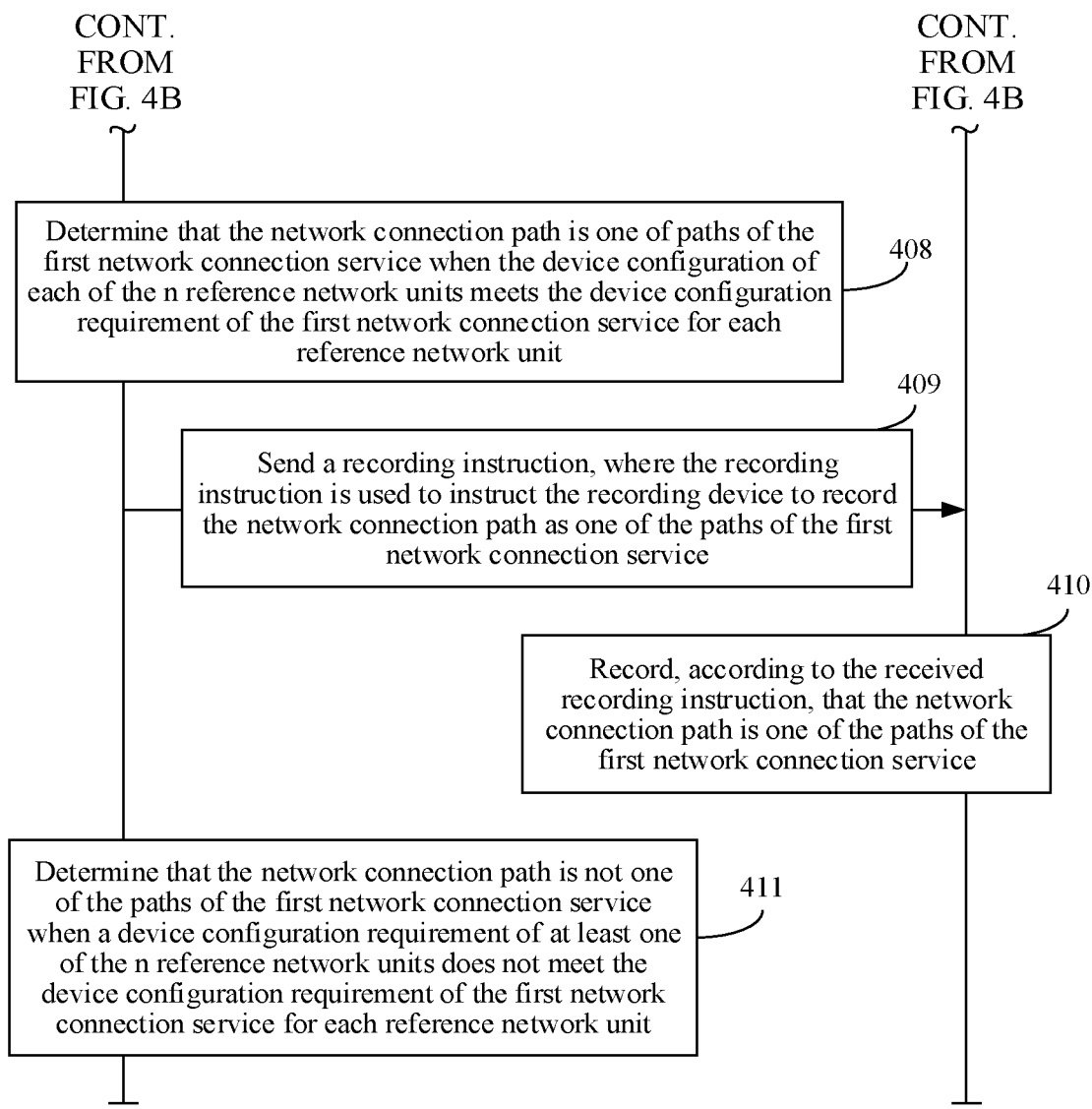

FIG. 4B and FIG. 4C is a flowchart of another network connection path determining method according to an embodiment of the present disclosure. The method may be applied to a communications system provided in an embodiment of the present disclosure. As shown in FIG. 4B and FIG. 4C, the network connection path determining method may include the following steps.

Step 401: A path determining device determines a plurality of deployed network domains deployed by a first network connection service in a plurality of network domains.

It should be noted that the communications network including the plurality of network units 01 in FIG. 1 is located in the plurality of network domains, and each network connection service may be deployed in some or all of the network domains. When a network connection service is deployed in a network domain, the network connection service may be implemented based on a network unit in the network domain.

Before step 401, the path determining device may obtain device configuration information of each network unit. For example, the path determining device obtains device configuration information of a network unit in a manner of communicating with the network unit (the device configuration information is used to instruct a device configuration), or the path determining device obtains device configuration information of a network unit by using a management device of the network unit. Then, the path determining device may determine, based on the obtained device configuration information, the plurality of network domains in which the plurality of network units is located.

In step 401, the path determining device may receive identifiers, entered by a user, of the plurality of deployed network domains deployed by the first network connection service, and determine that a network domain indicated by each of the identifiers of the deployed network domains in the plurality of network domains is a deployed network domain.

Step 402: The path determining device obtains a device configuration requirement corresponding to each border network unit group in each deployed network domain.

At least one border network unit group may exist in each deployed network domain. In the at least one border network unit group, each border network unit group includes at least one border network unit that is in the deployed network domain and that accesses one network domain (different from the deployed network domain), and border network units in different border network unit groups access different network domains. It should be noted that there is a plurality of network units in each network domain, and a border network unit in the plurality of network units is a network unit that is in the plurality of network units and that is connected to a device outside the network domain.

Figure 5:
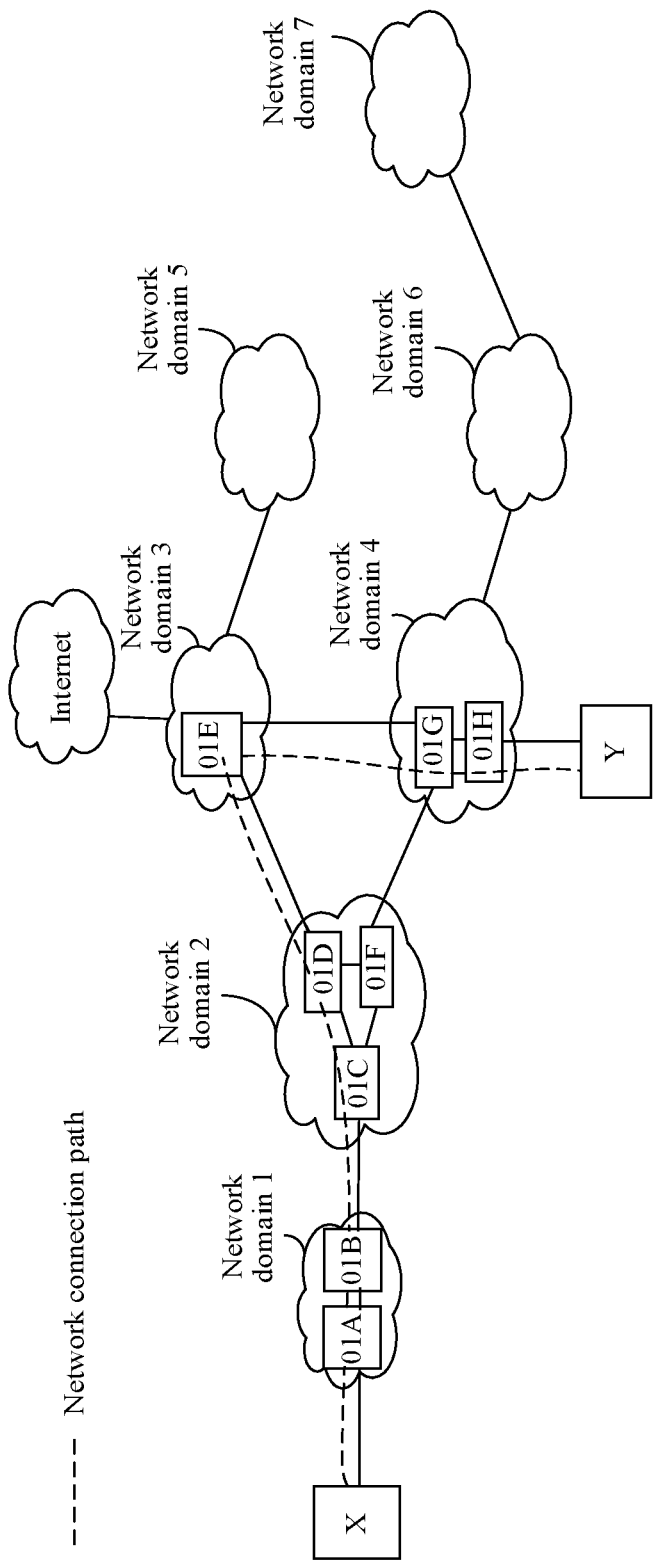
FIG. 5 is a schematic diagram of another network connection path according to an embodiment of the present disclosure.

As shown in FIG. 5, the plurality of deployed network domains of the first network connection service include a network domain 1, a network domain 2, a network domain 3, a network domain 4, a network domain 5, a network domain 6, and a network domain 7. It should be noted that FIG. 5 shows only some network units in some network domains. Optionally, these network domains may include a plurality of types of network domains. For example, the network domain 1 is a network domain of a PON type, the network domain 2 and the network domain 6 are both network domains of an OTN type, the network domain 3 and the network domain 4 are both network domains of an IP core type, the network domain 5 is a network domain of a packet transport network (PTN) type, and the network domain 7 is a network domain of a customer premises equipment (CPE) type. The network domain 1 and the network domain 2 can communicate with each other based on the 802.1Q standard. The network domain 2 and the network domain 4 may communicate with each other based on the QinQ communications standard. Communication may be performed between the network domain 2 and the network domain 3, between the network domain 3 and the network domain 5, and between the network domain 4 and the network domain 6 based on the QinQ communications standard.

The network domain 1 includes a border network unit group that accesses the network domain 2 and a border network unit group that accesses a network domain (not shown in FIG. 5) in which a terminal X is located. The network domain 2 includes a border network unit group that accesses the access network domain 1, a border network unit group that accesses the network domain 3, and a border network unit group that accesses the network domain 4. The network domain 3 includes a border network unit group that accesses a network domain (not shown in FIG. 5) in which the internet is located, the border network unit group that accesses the network domain 2, the border network unit group that accesses the network domain 4, and a border network unit group that accesses the network domain 5. The network domain 4 includes a border network unit group that accesses a network domain (not shown in FIG. 5) in which a terminal Y is located, the border network unit group that accesses the network domain 2, the border network unit group that accesses the network domain 3, and a border network unit group that accesses the network domain 6. The network domain 5 includes the border network unit group that accesses the network domain 3. The network domain 6 includes the border network unit group that accesses the network domain 4 and a border network unit group that accesses the network domain 7. The network domain 7 includes the border network unit group that accesses the network domain 6. It should be noted that none of the network domain in which the terminal X is located, the network domain in which the terminal Y is located, and the network domain in which the internet is located belongs to the network domain in which the network unit in the communications system is located.

Optionally, the device configuration requirement corresponding to each border network unit group is a device configuration requirement of the first network connection service for any border network unit in the border network unit group. Therefore, in step 402, the path determining device may first determine any border network unit in each border network unit group. Then, the path determining device needs to obtain the device configuration requirement of the first network connection service for the border network unit (for example, receive a device configuration requirement, entered by the user, of the first network connection service for the border network unit), and determine the device configuration requirement as a device configuration requirement corresponding to the border network unit group. The device configuration requirement corresponding to the border network unit group may be considered as a device configuration requirement, of the first network connection service for each border network unit in the border network unit group, namely, a device configuration requirement that needs to be met by a device configuration of a border network unit when a network domain in which the border network unit is located is connected to a network domain accessed by the border network unit.

Step 403: The path determining device obtains a connection relationship between the plurality of deployed network domains.

Optionally, the path determining device may determine the connection relationship by receiving a connection relationship that is between the plurality of deployed network domains and that is entered by the user. Alternatively, the path determining device may determine the connection relationship between the plurality of deployed network domains based on device configuration information of network units in the plurality of deployed network domains. This is not limited in this embodiment of the present disclosure.

For example, the connection relationship between the plurality of deployed network domains in FIG. 5 may include a relationship in which the network domain 1, the network domain 2, the network domain 3, and the network domain 5 are sequentially connected, a relationship in which the network domain 1, the network domain 2, and the network domain 4, the network domain 6, and the network domain 7 are sequentially connected, and a relationship in which the network domain 3 and the network domain 4 are connected.

Step 404: The path determining device determines a basic connection path between network units in each deployed network domain.

Optionally, the path determining device may determine, based on a device configuration information of each network unit in the deployed network domain, the basic connection path between the network units in the deployed network domain. Alternatively, each deployed network domain corresponds to one management device. The management device may determine, based on a device configuration information of each network unit in the deployed network domain, the basic connection path between the network units in the deployed network domain. The path determining device may obtain the basic connection path determined by the management device.

For example, as shown in FIG. 5, a basic connection path between network units in the network domain 2 (one deployed network domain) may include a basic connection path between any two of a network unit 01C, a network unit 01D, and a network unit 01F.

Step 405: The path determining device connects basic connection paths in at least two deployed network domains based on the determined connection relationship, to obtain a network connection path that passes through m reference network units.

After determining the connection relationship between the plurality of deployed network domains and a connection relationship between the network units in each deployed network domain, the path determining device may connect the basic connection paths in the at least two deployed network domains based on the connection relationship, to obtain the network connection path. The network connection path passes through the m reference network units, where m≥1, and the reference network unit is a network unit that is in a network domain to which the reference network unit belongs and that is connected to a device outside the network domain. For example, the network unit 01C, the network unit 01D, and the network unit 01F in the network domain 2 in FIG. 5 are all reference network units.

It should be noted that a primary network domain exists in a plurality of network domains in which the plurality of network units in the communications system are located, and the primary network domain is connected to more network domains than another network domain does in the plurality of network domains. The other network domain is any network domain other than the primary network domain in the plurality of network domains. Optionally, the network connection path can implement an end-to-end connection. For example, the network connection path may be used to connect a terminal and the primary network domain, or the network connection path may be used to connect a plurality of terminals. Alternatively, the network connection path is used to connect only network units in any two deployed network domains. This is not limited in this embodiment of the present disclosure.

In addition, it should be noted that, in this embodiment of the present disclosure, an example in which the network connection path passes through reference network units in at least two network domains is used. Optionally, the network connection path may alternatively pass through only a reference network unit in one network domain. This is not limited in this embodiment of the present disclosure.

Step 406: The path determining device determines a device configuration requirement corresponding to a border network unit group in which each of the n reference network units that the network connection path passes through is located as a device configuration requirement of the first network connection service for the reference network unit, where m≥n≥1.

After determining the network connection path, the path determining device may determine the n reference network units that the network connection path passes through. Then, the path determining device may determine the border network unit group in which the reference network unit is located for each of the n reference network units. Finally, the path determining device may search, in the device configuration requirement obtained in step 402, for the device configuration requirement corresponding to the border network unit group in which the reference network unit is located, and use the device configuration requirement as the device configuration requirement of the first network connection service for the reference network unit.

In addition, because the device configuration requirement corresponding to the border network unit group is obtained in advance in step 402, the device configuration requirement of the first network connection service for the reference network unit can be easily obtained in step 406. It should be noted that the first network connection service may have a same device configuration requirement or different device configuration requirements for any two reference network units.

Step 407: The path determining device determines whether a device configuration of each of n reference network units meets the device configuration requirement of the first network connection service for each reference network unit. If the device configuration of each of the n reference network units meets the device configuration requirement of the first network connection service for each reference network unit, step 408 is performed. If a device configuration requirement of at least one of the n reference network units does not meet the device configuration requirement of the first network connection service for the reference network unit, step 411 is performed.

For step 407, refer to step 303. Details are not described in this embodiment of the present disclosure again.

Step 408: The path determining device determines that the network connection path is one of paths of the first network connection service.

Step 409: The path determining device sends a recording instruction to a recording device, where the recording instruction is used to instruct the recording device to record the network connection path as one of the paths of the first network connection service.

When the network connection path is one of the paths of the first network connection service, the path determining device may send the recording instruction to the recording device, to instruct the recording device to record the network connection path as one of the paths of the first network connection service.

Step 410: The path determining device records, according to the received recording instruction, that the network connection path is one of the paths of the first network connection service.

Optionally, the recording device may record a correspondence between an identifier of the first network connection service and identifiers of the n reference network units that the network connection path passes through, to record the network connection path as one of the paths of the first network connection service.

Step 411: The path determining device determines that the network connection path is not one of the paths of the first network connection service.

If the device configuration of the at least one of the n reference network units does not meet the device configuration requirement of the first network connection service for the reference network unit, the path determining device may determine that the network unit on the network connection path cannot provide the first network connection service. Therefore, it may be determined that the network connection path is not one of the paths of the first network connection service.

In the following, a network connection path passing through a reference network unit 01A, a reference network unit 01B, a reference network unit 01C, a reference network unit 01D, and a reference network unit 01E in FIG. 5 is used. The foregoing method is described by using an example in which the reference network unit 01A, the reference network unit 01B, and the reference network unit 01C, the reference network unit 01D, and the reference network unit 01E are the n reference network units that the network connection path passes through.

As shown in FIG. 5, it is assumed that the first network connection service is a network connection service of a 10 megabits per second (M) bandwidth package (for example, an internet access private line service of a 10M bandwidth package, or an interconnection private line service of a 10M bandwidth package). A device configuration requirement of the first network connection service for the reference network unit 01A is: a VLAN address range is [100, 200], and a QoS configuration is a device default QoS configuration. A device configuration requirement of the first network connection service for the reference network unit 01B is a VLAN address range is [10, 100], and a QoS configuration is a QoS configuration corresponding to a 10M bandwidth (generally, QoS configurations of the plurality of network units in the communications system are classified into a plurality of types of QoS configurations, and the plurality of types of QoS configurations one-to-one correspond to a plurality of types of bandwidths (for example, a 10M bandwidth, a 20M bandwidth, and the like). A device configuration requirement of the first network connection service for the reference network unit 01C is a VLAN address range is [10, 100], and a QoS configuration is a QoS configuration corresponding to a 10M bandwidth. A device configuration requirement of the first network connection service for the reference network unit 01D is a VLAN address range is [10, 50], and a QoS configuration is a device default QoS configuration. A device configuration requirement of the first network connection service for the reference network unit 01E is a VLAN address range is [10, 100], and a QoS configuration is a device default QoS configuration.

In a device configuration of the network unit 01A, a VLAN address is 100, and the QoS configuration is the device default QoS configuration. In a device configuration of the network unit 01B, a VLAN address is 10, and the QoS configuration is the QoS configuration corresponding to the 10M bandwidth. In a device configuration of the network unit 01C, a VLAN address is 10, and the QoS configuration is the QoS configuration corresponding to the 10M bandwidth. In a device configuration of the network unit 01D, a VLAN address is 50, and the QoS configuration is the device default QoS configuration. In a device configuration of the network unit 01E, a VLAN address is 10, and the QoS configuration is the device default QoS configuration. It can be learned that a configuration of each of the reference network unit 01A, the reference network unit 01B, the reference network unit 01C, the reference network unit 01D, and the reference network unit 01E meets a device configuration requirement of the first network connection service for the reference network unit. In this case, the path determining device may determine that the network connection path passing through the reference network unit 01A, the reference network unit 01B, the reference network unit 01C, the reference network unit 01D, and the reference network unit 01E is one of paths of the first network connection service.

If the VLAN address in the device configuration of the reference network unit 01A is changed to 10 in the foregoing device configurations of the reference network unit 01A, the reference network unit 01B, the reference network unit 01C, the reference network unit 01D, and the reference network unit 01E, it may be determined that a device configuration of a reference network unit 01 does not meet a device configuration requirement of the first network connection service for the reference network unit 01. Therefore, the path determining device may determine that the network connection path passing through the reference network unit 01A, the reference network unit 01B, and the reference network unit 01C, the reference network unit 01D, and the reference network unit 01E is not one of the paths of the first network connection service.

The following describes the foregoing method by using an example in which a network connection path passes through a reference network unit 01A, a reference network unit 01B, a reference network unit 01C, a reference network unit 01D, a reference network unit 01E, a reference network unit 01F, and a reference network unit 01G in FIG. 5.

As shown in FIG. 5, it is assumed that the first network connection service is a network connection service of a 10M bandwidth package (for example, an interconnection private line service of a 10M bandwidth package). A device configuration requirement of the first network connection service for the reference network unit 01A is a VLAN address range is [100, 200], and a QoS configuration is a device default QoS configuration. A device configuration requirement of the first network connection service for the reference network unit 01B is a VLAN address range is [10, 100], and a QoS configuration is a QoS configuration corresponding to a 10M bandwidth. A device configuration requirement of the first network connection service for the reference network unit 01C is a VLAN address range is [10, 100], and a QoS configuration is a QoS configuration corresponding to a 10M bandwidth. A device configuration requirement of the first network connection service for the reference network unit 01D is a VLAN address range is [10, 50], and a QoS configuration is a device default QoS configuration. A device configuration requirement of the first network connection service for the reference network unit 01E is a VLAN address range is [10, 100], and a QoS configuration is a device default QoS configuration. A device configuration requirement of the first network connection service for the reference network unit 01G is a VLAN address range is [10, 50], and a QoS configuration is a QoS configuration corresponding to a 10M bandwidth. A device configuration requirement of the first network connection service for the reference network unit 01H is a VLAN address range is [10, 100], and a QoS configuration is a QoS configuration corresponding to a 10M bandwidth.

In a device configuration of the network unit 01A, a VLAN address is 100, and the QoS configuration is the device default QoS configuration. In a device configuration of the network unit 01B, a VLAN address is 10, and the QoS configuration is the QoS configuration corresponding to the 10M bandwidth. In a device configuration of the network unit 01C, a VLAN address is 10, and the QoS configuration is the QoS configuration corresponding to the 10M bandwidth. In a device configuration of the network unit 01D, a VLAN address is 50, and the QoS configuration is the device default QoS configuration. In a device configuration of the network unit 01E, a VLAN address is 10, and the QoS configuration is the device default QoS configuration. In a device configuration of the network unit 01G, a VLAN address is 10, and the QoS configuration is the QoS configuration corresponding to the 10M bandwidth. In a device configuration of the network unit 01H, a VLAN address is 100, and the QoS configuration is the QoS configuration corresponding to the 10M bandwidth. It can be learned that a configuration of each of the reference network unit 01A, the reference network unit 01B, the reference network unit 01C, the reference network unit 01D, and the reference network unit 01E, the reference network unit 01G, and the reference network unit 01H meets a device configuration requirement of the first network connection service for the reference network unit. In this case, the path determining device may determine that the network connection path passing through the reference network unit 01A, the reference network unit 01B, the reference network unit 01C, the reference network unit 01D, and the reference network unit 01E, the reference network unit 01G, and the reference network unit 01H is one of paths of the first network connection service.

If the VLAN address in the device configuration of the reference network unit 01A is changed to 10 in the foregoing device configurations of the reference network unit 01A, the reference network unit 01B, the reference network unit 01C, the reference network unit 01D, and the reference network unit 01E, the reference network unit 01G, and the reference network unit 01H, it may be determined that a device configuration of a reference network unit 01 does not meet a device configuration requirement of the first network connection service for the reference network unit 01. Therefore, the path determining device may determine that the network connection path passing through the reference network unit 01A, the reference network unit 01B, and the reference network unit 01C, the reference network unit 01D, and the reference network unit 01E, the reference network unit 01G, and the reference network unit 01H is not one of the paths of the first network connection service.

Optionally, when a judgment result in step 407 is that each of the n reference network units meets a device configuration requirement of the first network connection service for the reference network unit, the network connection path may not be directly determined as one of the paths of the first network connection service. For example, in step 408, the path determining device may first present (for example, in a manner of displaying or playing a voice) a judgment result about whether each of the n reference network units meets the device configuration requirement of the first network connection service. The user may determine, based on the judgment result presented by the path determining device, whether each of the n reference network units meets the device configuration requirement of the first network connection service for the reference network unit, and perform an operation on the path determining device, to trigger the path determining device to receive an instruction for the judgment result. The path determining device determines the network connection path as one of the paths of the first network connection service only when the instruction is used to instruct that the network connection path is allowed to be determined as one of the paths of the first network connection service.

For example, the instruction of the judgment result may be a first instruction or a second instruction. The first instruction is used to instruct that the network connection path is allowed to be determined as one of the paths of the first network connection service, and the second instruction is used to instruct that the network connection path is forbidden to be determined as one of the paths of the first network connection service. When each of the n reference network units meets the device configuration requirement of the first network connection service for the reference network unit, the user may perform an operation on the path determining device, to trigger the path determining device to receive the first instruction. When not all the n reference network units meet the device configuration requirement of the first network connection service for the reference network unit, the user may perform an operation on the path determining device, to trigger the path determining device to receive the second instruction. When receiving the first instruction, the path determining device may determine the network connection path as one of the paths of the first network connection service. When receiving the second instruction, the path determining device may determine that the network connection path is not one of the paths of the first network connection service (that is, step 411 is performed).

In this way, after determining whether each of the n reference network units meets the device configuration requirement of the first network connection service for the reference network unit, the path determining device may further determine, with reference to re-determining by the user, whether the network connection path that passes through the n reference network units is one of the paths of the first network connection service. Therefore, accuracy of a determined relationship between the network connection service and the path can be improved.

Optionally, the device configuration requirement of the first network connection service for each of the n reference network units includes p types of device configuration requirements, where p≥1. In the foregoing embodiment, an example in which the deployed network domain is a network domain deployed by the first network connection service in the plurality of network domains is used. Optionally, the deployed network domain may further be a network domain that is deployed by the first network connection service and in which each reference network unit in the network domain has the p types of device configurations. In other words, the network domain deployed by the first network connection service in the plurality of network domains is not necessarily the deployed network domain determined in step 401. When the first network connection service is deployed in a network domain, and each reference network unit in the network domain has the p types of device configurations, it may be considered that the network domain is the deployed network domain determined in step 401. This is not limited in this embodiment of the present disclosure.

For example, it is assumed that the p types of device configurations include a QoS configuration. When a reference network unit in a network domain deployed by the first network connection service has no QoS configuration, it may be considered that the network domain is not the deployed network domain. When each reference network unit in a network domain deployed by the first network connection service has the QoS configuration, it may be considered that the network domain is the deployed network domain. In this way, a quantity of determined deployed network domains can be reduced, and a process of determining whether the network connection path is one of the paths of the first network connection service can be simplified.

It should be noted that there is usually a plurality of network connection paths in a communications network, and a plurality of network connection services are usually deployed in the communications network. Based on the method provided in this embodiment of the present disclosure, the path determining device can determine whether each network connection path is one of paths of each network connection service, so as to determine a path of each of the plurality of network connection services.

In addition, it should be noted that, in a process of determining whether each of the plurality of network connection paths is one of paths of a network connection service, the path determining device may first perform step 401 to step 404. Each time when determining whether a network connection path is one of the paths of the network connection service, the path determining device may perform step 405 to step 411 once. Information such as the deployed network domain, the device configuration requirement, the connection relationship, and the basic connection path that are determined in step 401 to step 404 is used in a process of determining whether the network connection path is one of the paths of the network connection each time.

When the path determining device determines that the network connection path that passes through the m reference network units is one of the paths of the first network connection service (equivalent to that the network connection path is used to implement the first network connection service), the path determining device may further change, based on this result, the network connection service that is implemented by using the network connection path.

The following explains and describes a change process by using an example in which the network connection service that is implemented by using the network connection path is changed from the first network connection service to a second network connection service. It should be noted that different network connection services may have different device configuration requirements for the network unit. In this case, a device configuration of at least one of the n reference network units does not meet a device configuration requirement of the second network connection service for the network unit. In the following explanation and description, an example in which the at least one target network unit includes a target network unit 01A and a target network unit 01B is used.

Figure 6A:
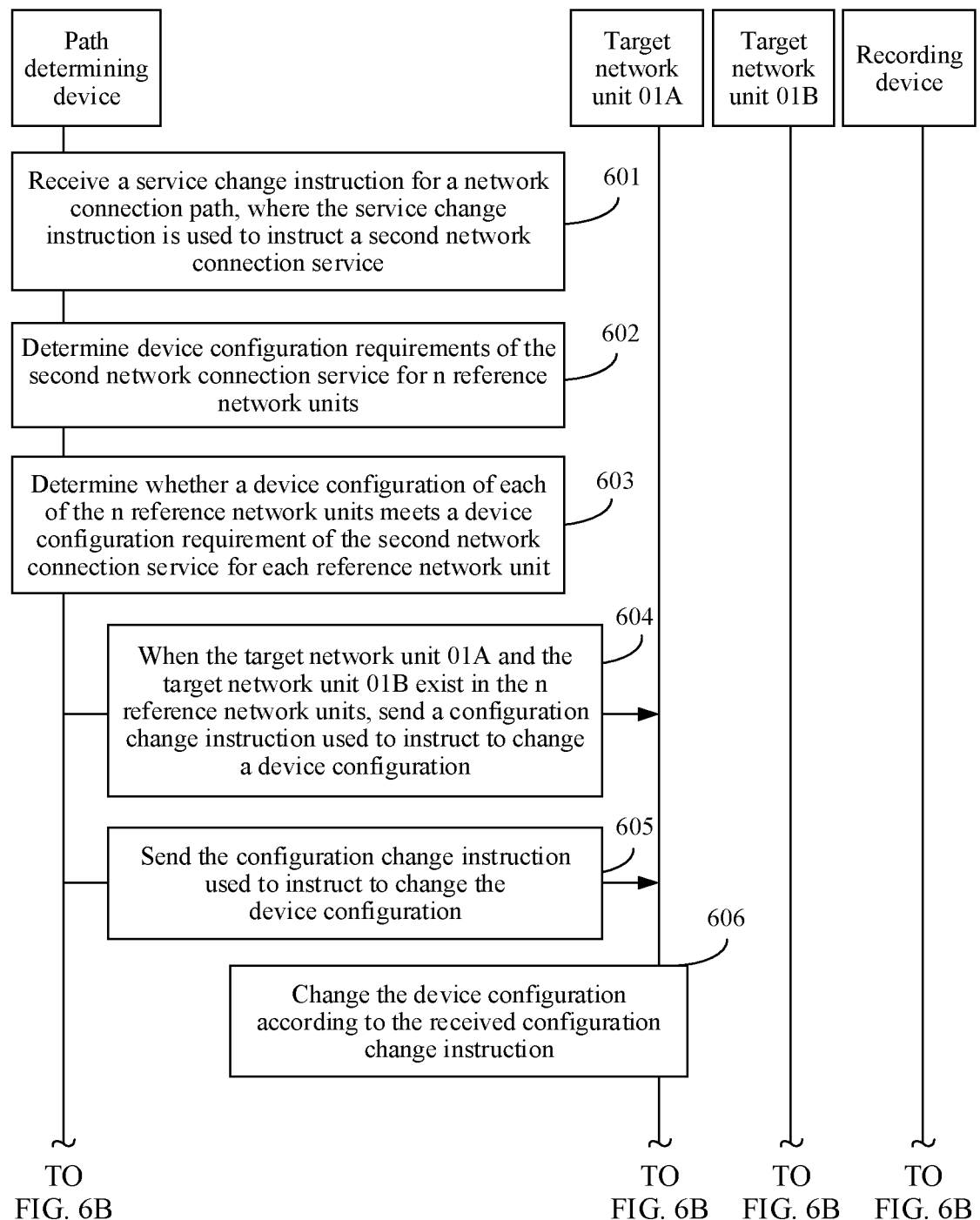

As shown in FIG. 6A and FIG. 6B, a process of changing a network connection service that is implemented by using a network connection path from a first network connection service to a second network connection service may include the following steps.

Step 601: A path determining device receives a service change instruction for the network connection path, where the service change instruction is used to instruct the second network connection service.

Step 602: The path determining device determines device configuration requirements of the second network connection service for n reference network units.

It should be noted that, the path determining device may determine the device configuration requirement of the second network connection service for the reference network unit with reference to step 406. Details are not described in this embodiment of the present disclosure.

Step 603: The path determining device determines whether a device configuration of each of the n reference network units meets a device configuration requirement of the second network connection service for each reference network unit. If the target network unit 01A and the target network unit 01B exist in the n reference network units, step 604 is performed. If the target network unit does not exist in the n reference network units, step 608 is performed.

In the target network unit 01A and the target network unit 01B, a device configuration of each target network unit does not meet a device configuration requirement of the second network connection service for the network unit. It should be noted that, the path determining device may determine, with reference to step 407, whether the device configuration of each reference network unit meets the device configuration requirement of the second network connection service for each reference network unit. Details are not described in this embodiment of the present disclosure.

Step 604: The path determining device sends, to the target network unit 01A, a configuration change instruction used to instruct to change a device configuration.

When the device configuration of the target network unit 01A does not meet a device configuration requirement of the second network connection service for the network unit, the path determining device may send the configuration change instruction to the target network unit 01A, to instruct the target network unit 01A to change the device configuration to a specified device configuration (for example, change a VLAN address from 99 to 100), so that the device configuration of the target network unit 01A can meet the device configuration requirement of the second network connection service for the network unit.

Step 605: The path determining device sends, to the target network unit 01B, a configuration change instruction used to instruct to change a device configuration.

When determining that the device configuration of the target network unit 01B does not meet a device configuration requirement of the second network connection service for the network unit, the path determining device may send the configuration change instruction to the target network unit 01B, to instruct the target network unit 01B to change the device configuration to a specified device configuration, so that the device configuration of the target network unit 01B can meet the device configuration requirement of the second network connection service for the network unit.

Step 606: The target network unit 01A changes the device configuration according to the received configuration change instruction.

Step 607: The target network unit 01B changes the device configuration according to the received configuration change instruction.

Step 608: The path determining device determines that the network connection path is one of paths of the second network connection service.

After the path determining device indicates each target network unit to change the device configuration, the device configuration of each of the n reference network units meets the device configuration requirement of the second network connection service for the network unit.

When the device configuration of each of the n reference network units meets the device configuration requirement of the second network connection service for the network unit, the path determining device may determine that the network connection path is one of the paths of the second network connection service rather than one of paths of the first network connection service.

Step 609: The path determining device sends a record change instruction to a recording device, where the record change instruction is used to instruct the recording device to change a record that the network connection path is one of the paths of the first network connection service to a record that the network connection path is one of the paths of the second network connection service.

When the network connection path is one of the paths of the second network connection service rather than one of the paths of the first network connection service, the path determining device may send the record change instruction to the recording device, to instruct the recording device to change the previous record.

Step 610: The recording device changes, according to the received change record instruction, the record that the network connection path is one of the paths of the first network connection service to the record that the network connection path is one of the paths of the second network connection service.

In conclusion, in the network connection path determining method provided in this embodiment of the present disclosure, a network connection path can be identified as one of paths of which network connection service. In this way, when searching for a network unit used to provide a network connection service, a staff member may directly search in a path of the network connection service. Therefore, difficulty and an error rate of searching for the network unit by the staff member are reduced, and change efficiency of the network connection service is improved.

In addition, a service implemented by using the network connection path can be automatically changed based on a determined relationship between the network connection path and the network connection service. Therefore, an effect that the staff member does not need to search for a network unit in the communications system can be implemented, and change efficiency of the network connection service is further improved.

Figure 7:
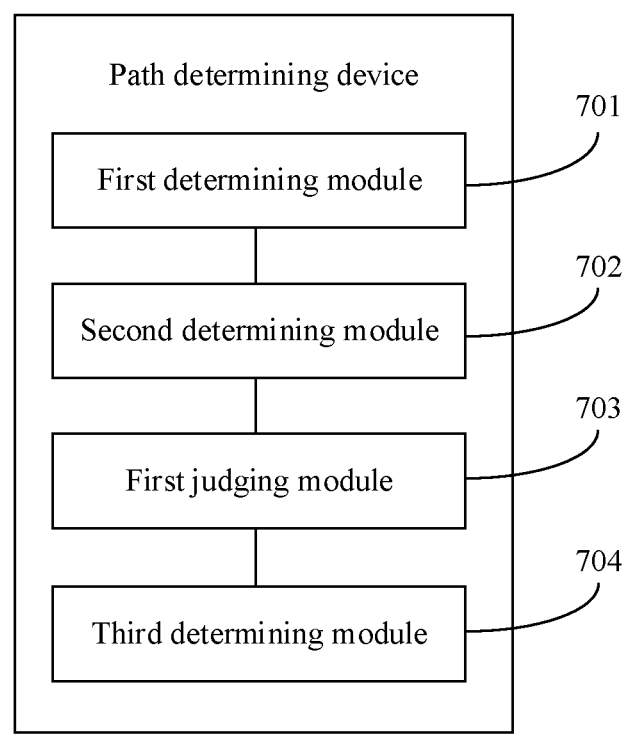
FIG. 7 is a schematic structural diagram of a path determining device according to an embodiment of the present disclosure.

FIG. 7 is a schematic structural diagram of a path determining device according to an embodiment of the present disclosure. The path determining device may be the path determining device in the communications system shown in FIG. 1. As shown in FIG. 7, the path determining device may include a first determining module 701, configured to determine a network connection path that passes through m reference network units, where m≥1, and the reference network unit is a network unit that is in a network domain in which the reference network unit is located and that is connected to a device outside the network domain in which the reference network unit is located, a second determining module 702, configured to determine a device configuration requirement of a first network connection service for each of n reference network units that the network connection path passes through, where m≥n≥1, a first judgment module 703, configured to determine whether a device configuration of each of the n reference network units meets the device configuration requirement of the first network connection service for each reference network unit, and a third determining module 704, configured to determine that the network connection path is one of paths of the first network connection service when the device configuration of each of the n reference network units meets the device configuration requirement of the first network connection service for each reference network unit.

In conclusion, in the path determining device provided in this embodiment of the present disclosure, a network connection path can be identified as one of paths of which network connection service. In this way, when searching for a network unit used to provide a network connection service, a staff member may directly search in a path of the network connection service. Therefore, difficulty and an error rate of searching for the network unit by the staff member are reduced, and change efficiency of the network connection service is improved.

Optionally, a plurality of network units is located in a plurality of network domains, and a network connection path passes through reference network units in at least two network domains.

Figure 8:
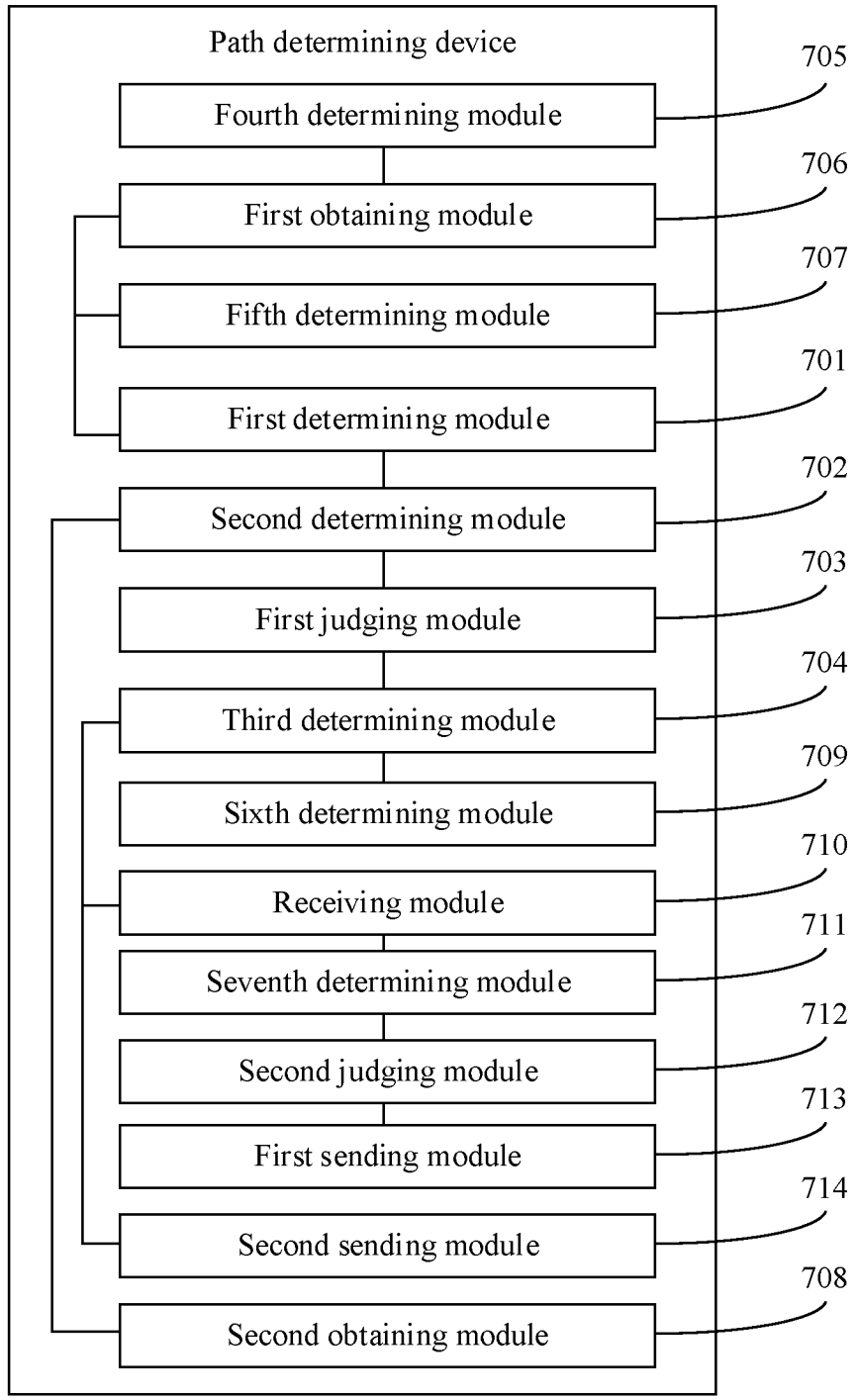
FIG. 8 is a schematic structural diagram of another path determining device according to an embodiment of the present disclosure.

Optionally, FIG. 8 is a schematic structural diagram of another path determining device according to an embodiment of the present disclosure. As shown in FIG. 8, based on FIG. 7, the path determining device may further include a fourth determining module 705, configured to determine a plurality of deployed network domains deployed by the first network connection service in the plurality of network domains, a first obtaining module 706, configured to obtain a connection relationship between the plurality of deployed network domains, and a fifth determining module 707, configured to determine a basic connection path between network units in each deployed network domain.

The first determining module 701 is configured to connect basic connection paths in at least two deployed network domains based on the determined connection relationship, to obtain the network connection path.

Optionally, at least one deployed network domain deployed by the first network connection service exists in the at least one network domain, at least one border network unit group exists in each of the at least one deployed network domain, the border network unit group includes at least one border network unit that accesses one network domain in each deployed network domain, and border network units in different border network unit groups access different network domains. The path determining device may further include a second obtaining module 708, configured to obtain a device configuration requirement corresponding to each border network unit group in each deployed network domain, where the device configuration requirement corresponding to each border network unit group is a device configuration requirement of the first network connection service for any border network unit in each border network unit group.

The second determining module 702 is configured to determine a device configuration requirement corresponding to a border network unit group in which each of the n reference network units is located as the device configuration requirement of the first network connection service for each reference network unit.

Optionally, the third determining module 704 may be configured to, when the device configuration of each of the n reference network units meets the device configuration requirement of the first network connection service for each reference network unit, present a judgment result about whether the device configuration of each of the n reference network units meets the device configuration requirement of the first network connection service for each reference network unit, receive an instruction for the judgment result, where the instruction for the judgment result is a first instruction used to instruct that the network connection path is allowed to be determined as one of the paths of the first network connection service, or a second instruction used to instruct that the network connection path is forbidden to be determined as one of the paths of the first network connection service, and when the instruction for the judgment result is the first instruction, determine that the network connection path is one of the paths of the first network connection service.

The path determining device may further include a sixth determining module 709, configured to, when the instruction for the judgment result is the second instruction, determine that the network connection path is not one of the paths of the first network connection service.

Optionally, the path determining device may further include a receiving module 710, configured to receive a service change instruction for the network connection path, where the service change instruction is used to instruct to change the first network connection service to a second network connection service, a seventh determining module 711, configured to determine device configuration requirements of the second network connection service for the n reference network units, a second judgment module 712, configured to determine whether a device configuration of each of the n reference network units meets a device configuration requirement of the second network connection service for each reference network unit, and a first sending module 713, configured to when at least one target network unit exists in the n reference network units, send, according to the service change instruction, a configuration change instruction used to instruct to change a device configuration to the at least one target network unit.

Before each target network unit changes the device configuration according to the received configuration change instruction, the device configuration of each target network unit does not meet a device configuration requirement of the second network connection service for each target network unit, and after each target network unit changes the device configuration according to the received configuration change instruction, the device configuration of each target network unit meets the device configuration requirement of the second network connection service for each target network unit.

Optionally, the communications system further includes a recording device, and the path determining device may further include a second sending module 714, configured to, when it is determined that the network connection path is one of the paths of the first network connection service, send a recording instruction to the recording device, where the recording instruction is used to instruct the recording device to record the network connection path as one of the paths of the first network connection service.

Optionally, the communications system further includes a plurality of management devices that one-to-one correspond to the plurality of network domains, and each management device is connected to a network unit in a network domain corresponding to the management device.

The fifth determining module 707 may be configured to receive the basic connection path that is between the network units in each deployed network domain and that is sent by a management device corresponding to each of the plurality of deployed network domains.

Optionally, the device configuration includes at least one of a QoS configuration, a VLAN address, a communication protocol, and a device protection configuration.

In conclusion, in the path determining device provided in this embodiment of the present disclosure, a network connection path can be identified as one of paths of which network connection service. In this way, when searching for a network unit used to provide a network connection service, a staff member may directly search in a path of the network connection service. Therefore, difficulty and an error rate of searching for the network unit by the staff member are reduced, and change efficiency of the network connection service is improved.

In addition, the path determining device may further automatically change, based on a determined relationship between the network connection path and the network connection service, a service implemented by using the network connection path. Therefore, an effect that the staff member does not need to search for a network unit in the communications system can be implemented, and change efficiency of the network connection service is further improved.

Figure 9:
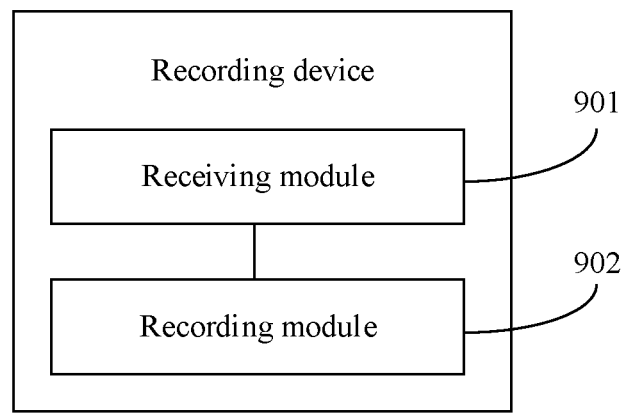
FIG. 9 is a schematic structural diagram of a recording device according to an embodiment of the present disclosure.

FIG. 9 is a schematic structural diagram of a recording device according to an embodiment of the present disclosure. The recording device may be the recording device in the communications system shown in FIG. 1. As shown in FIG. 9, the recording device may include a receiving module 901, configured to receive a recording instruction sent by the path determining device, where the recording instruction is used to instruct the recording device to record a network connection path as one of paths of a first network connection service, and a recording module 902, configured to record, according to the recording instruction, that the network connection path is one of the paths of the first network connection service.

Figure 10:
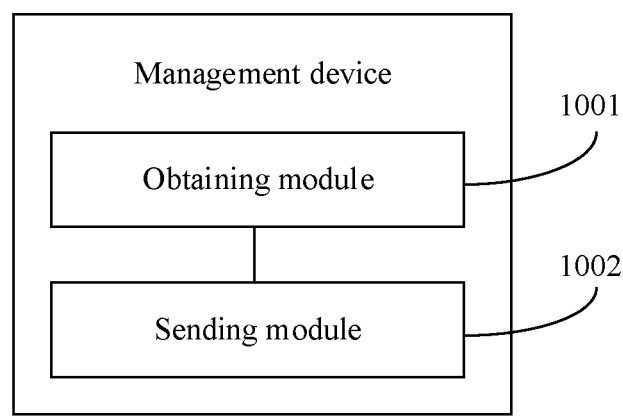
FIG. 10 is a schematic structural diagram of a management device according to an embodiment of the present disclosure.

FIG. 10 is a schematic structural diagram of a management device according to an embodiment of the present disclosure. The management device may be any management device in the communications system shown in FIG. 1. When a network domain corresponding to the management device is a deployed network domain deployed by the first network connection service, as shown in FIG. 10, the management device may include an obtaining module 1001, configured to obtain a basic connection path between network units in the deployed network domain, and a sending module 1002, configured to send the basic connection path to the path determining device.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

It should be noted that the method embodiment provided in the embodiments of the present disclosure and the corresponding device embodiments can be referenced to each other. This is not limited in this embodiment of the present disclosure. It should be noted that a sequence of the steps of the method embodiment provided in the embodiments of the present disclosure can be adjusted properly, and a step may also be added or removed according to a situation. Any modified method that can be readily figured out by a person skilled in the art without departing from a technical scope disclosed in the present disclosure shall fall within the protection scope of the present disclosure, and therefore details are not described.

The foregoing descriptions are merely optional embodiments of this application, but are not intended to limit this application. Any modification, equivalent replacement, or improvement made without departing from the principle of this application should fall within the protection scope of this application.

What is claimed is:

1. A method implemented by a path determining device in a communications system, wherein the communications system comprises a plurality of network devices located in one or more network domains, and wherein the method comprises:
   determining a network connection path that passes through m reference network devices in the network devices, wherein m≥1, and wherein the m reference network devices are located in a first network domain and are coupled to a device outside the first network domain;
   determining a first device configuration requirement of a first network connection service for each of n reference network devices of the m reference network devices, wherein m≥n≥1;
   determining whether a device configuration of each of the n reference network devices meets the first device configuration requirement, wherein the device configuration comprises a quality of service (QoS) configuration, a virtual local area network (VLAN) address, a communication protocol, or a device protection configuration; and
   determining that the network connection path is a path of the first network connection service when the device configuration of each of the n reference network devices meets the first device configuration requirement.

2. The method of claim 1, wherein the network devices are located in a plurality of second network domains, and wherein the network connection path passes through the m reference network devices in at least two second network domains.

3. The method of claim 2, wherein before determining the network connection path, the method further comprises:
   determining a plurality of deployed network domains of the first network connection service in the second network domains;
   obtaining a connection relationship between the deployed network domains;
   determining a basic connection path between network devices in each of the deployed network domains; and
   connecting basic connection paths in at least two deployed network domains based on the connection relationship to obtain the network connection path.

4. The method of claim 3, further comprising receiving the basic connection path from a management device of the communications system corresponding to each of the deployed network domains, wherein a plurality of management devices corresponds to the second network domains in a one-to-one manner, and wherein each of the management devices is coupled to a network device in a third network domain corresponding to each of the management devices.

5. The method of claim 1, wherein the one or more network domains comprise one or more deployed network domains of the first network connection service, wherein the one or more deployed network domains comprise one or more border network device groups, wherein the one or more border network device groups comprise one or more border network devices that accesses one network domain in each of the one or more deployed network domains, wherein border network devices in different border network device groups access different network domains, and wherein before determining the first device configuration requirement, the method further comprises:
   obtaining a second device configuration requirement corresponding to each of the one or more border network device groups, wherein the second device configuration requirement is of the first network connection service for one border network device in each of the one or more border network device groups; and
   determining a third device configuration requirement corresponding to a border network device group in which each of the n reference network devices is located as the first device configuration requirement.

6. The method of claim 1, further comprising:
presenting a judgment result about whether the device configuration meets the first device configuration requirement;
receiving, for the judgment result, either a first instruction instructing that the network connection path is allowed to be determined as the path of the first network connection service or a second instruction instructing that the network connection path is forbidden to be determined as the path of the first network connection service;
determining that the network connection path is the path of the first network connection service when receiving the first instruction; and
determining that the network connection path is not the path of the first network connection service when receiving the second instruction.

7. The method of claim 1, wherein after determining that the network connection path is the path of the first network connection service, the method further comprises:
receiving, for the network connection path, a service change instruction instructing to change the first network connection service to a second network connection service;
determining, for the n reference network devices, second device configuration requirements of the second network connection service;
determining, for each of the n reference network devices, whether the device configuration meets a third device configuration requirement of the second network connection service; and
sending, according to the service change instruction, a configuration change instruction instructing to change a second device configuration of a target network device when the target network device exists in the n reference network devices,
wherein the second device configuration does not meet the third device configuration requirement before the target network device changes the second device configuration, and
wherein the second device configuration meets the third device configuration requirement after the target network device changes the second device configuration.

8. The method of claim 1, further comprising sending, to a recording device of the communications system, a recording instruction instructing to record the network connection path as the path of the first network connection service.

9. A communications system comprising:
a plurality of network devices located in one or more network domains; and
a path determining device coupled to the network devices and configured to:
determine a network connection path that passes through m reference network devices in the network devices, wherein m≥1, and wherein the m reference network devices are located in a first network domain and are coupled to a device outside the first network domain;
determine a device configuration requirement of a first network connection service for each of n reference network devices in the m reference network devices, wherein m≥n≥1;
determine whether a device configuration of each of the n reference network devices meets the device configuration requirement, wherein the device configuration comprises a quality of service (QoS) configuration, a virtual local area network (VLAN) address, a communication protocol, or a device protection configuration; and
determine that the network connection path is a path of the first network connection service when the device configuration of each of the n reference network devices meets the device configuration requirement.

10. The communications system of claim 9, wherein the network connection path passes through the m reference network devices in at least two second network domains.

11. The communications system of claim 9, wherein path determining device is further configured to:
determine a plurality of deployed network domains of the first network connection service in the second network domains;
obtain a connection relationship between the deployed network domains;
determine a basic connection path between network devices in each of the deployed network domains; and
connect basic connection paths in at least two deployed network domains based on the connection relationship to obtain the network connection path.

12. The communications system of claim 9, wherein path determining device is further configured to:
present a judgment result about whether the device configuration meets the first device configuration requirement;
receive, for the judgment result, either a first instruction instructing that the network connection path is allowed to be determined as the path of the first network connection service or a second instruction instructing that the network connection path is forbidden to be determined as the path of the first network connection service;
determine that the network connection path is the path of the first network connection service when receiving the first instruction; and
determine that the network connection path is not the path of the first network connection service when receiving the second instruction.

13. The communications system of claim 9, wherein path determining device is further configured to send, to a recording device of the communications system, a recording instruction instructing to record the network connection path as the path of the first network connection service.

14. A path determining device comprising:
a non-transitory memory configured to store instructions; and
a processor coupled to the non-transitory memory, wherein the instructions cause the processor to be configured to:
determine a network connection path that passes through m reference network devices, wherein m≥1, and wherein the m reference network devices are located in a first network domain and are coupled to a device outside the network domain in which the reference network device is located;
determine a first device configuration requirement of a first network connection service for each of n reference network devices of the m reference network devices, wherein m≥n≥1;
determine whether a device configuration of each of the n reference network devices meets the first device configuration requirement, wherein the device configuration comprises a quality of service (QoS) configuration, a virtual local area network (VLAN) address, a communication protocol, or a device protection configuration; and determine that the network connection path is a path of the first network connection service when the device configuration of each of the n reference network devices meets the first device configuration requirement.

15. The path determining device of claim 14, wherein the network devices are located in a plurality of second network domains, and wherein the network connection path passes through the m reference network devices in at least two second network domains.

16. The path determining device of claim 15, wherein before determining the network connection path, the instructions further cause the processor to be configured to:

determine a plurality of deployed network domains of the first network connection service in the second network domains;

obtain a connection relationship between the deployed network domains;

determine a basic connection path between network devices in each of the deployed network domain; and connect basic connection paths in at least two deployed network domains based on the connection relationship to obtain the network connection path.

17. The path determining device of claim 14, wherein the one or more network domains comprise one or more deployed network domains of the first network connection service, wherein the one or more deployed network domains comprise one or more border network device groups, wherein the one or more border network device groups comprise one or more border network devices that accesses one network domain in each of the one or more deployed network domains, wherein border network devices in different border network device groups access different network domains, and wherein before determining the first device configuration requirement, instructions further cause the processor to be configured to:

obtain a second device configuration requirement corresponding to each of the one or more border network device groups, wherein the second device configuration requirement is of the first network connection service for one border network device in each of the one or more border network device groups; and determine a third device configuration requirement corresponding to a border network device group in which each of the n reference network devices is located as the first device configuration requirement.

18. The path determining device of claim 14, wherein the instructions further cause the processor to be configured to:

present a judgment result about whether the device configuration meets the first device configuration requirement;

receive, for the judgment result, either a first instruction instructing that the network connection path is allowed to be determined as the path of the first network connection service or a second instruction instructing that the network connection path is forbidden to be determined as the path of the first network connection service;

determine that the network connection path is the path of the first network connection service when receiving the first instruction; and determine that the network connection path is not the path of the first network connection service when receiving the second instruction.

19. The path determining device of claim 14, wherein after determining that the network connection path is the path of the first network connection service, the instructions further cause the processor to be configured to:

receive, for the network connection path, a service change instruction instructing to change the first network connection service to a second network connection service;

determine, for the n reference network devices, second device configuration requirements of the second network connection service;

determine, for each of the n reference network devices, whether the device configuration meets a third device configuration requirement of the second network connection service; and send, according to the service change instruction, a configuration change instruction instructing to change a second device configuration of a target network device when the target network device exists in the n reference network devices, wherein the second device configuration does not meet the third device configuration requirement before the target network device changes the second device configuration, and wherein the second device configuration meets the third device configuration requirement after the target network device changes the second device configuration.

20. The path determining device of claim 14, wherein the instructions further cause the processor to be configured to send, to a recording device of a communications system, a recording instruction instructing to record the network connection path as the path of the first network connection service.

* * * * *